US010685039B2

(12) United States Patent
Houvenaghel Defoort et al.

(10) Patent No.: US 10,685,039 B2
(45) Date of Patent: Jun. 16, 2020

(54) METHODS AND SYSTEM FOR COMPARING DATA OF AN ELECTRONIC DATASET

(71) Applicant: YTRIA INC., Montreal (CA)

(72) Inventors: Eric Houvenaghel Defoort, Montreal (CA); Laurent Seiter, Montreal (CA)

(73) Assignee: YTRIA INC., Montreal (CA)

(*) Notice: Subject to any disclaimer, the term of this patent is extended or adjusted under 35 U.S.C. 154(b) by 440 days.

(21) Appl. No.: 15/478,510

(22) Filed: Apr. 4, 2017

(65) Prior Publication Data
US 2017/0286514 A1 Oct. 5, 2017

Related U.S. Application Data

(60) Provisional application No. 62/318,266, filed on Apr. 5, 2016.

(51) Int. Cl.
*G06F 16/27* (2019.01)
*G06F 16/22* (2019.01)
*G06F 16/23* (2019.01)
*G06F 16/245* (2019.01)
*G06F 16/248* (2019.01)

(52) U.S. Cl.
CPC .......... *G06F 16/27* (2019.01); *G06F 16/22* (2019.01); *G06F 16/23* (2019.01); *G06F 16/2365* (2019.01); *G06F 16/245* (2019.01); *G06F 16/248* (2019.01)

(58) Field of Classification Search
None
See application file for complete search history.

(56) References Cited

U.S. PATENT DOCUMENTS

2013/0046775 A1* 2/2013 Shapiro .................... G09B 7/02
707/758

OTHER PUBLICATIONS

Excel IF Statement—How to Use, (hereafter Excel Trick) https://web.archive.org/web/20130212183942/https://www.exceltrick.com/formulas_macros/excel-if-statement/, (Year: 2013).*
How can you change a cell value using VBA in Microsoft Excel?, https://www.quora.com/How-can-you-change-a-cell-value-using-VBA-in-Microsoft-Excel, (Year: 2017).*
How to Track Changes in Excel written by Aseem Kishore, https://www.online-tech-tips.com/ms-office-tips/track-changes-in-excel/, Mar 28, 2015 (Year: 2015).*

* cited by examiner

*Primary Examiner* — Robert W Beausoliel, Jr.
*Assistant Examiner* — Hau Hoang
(74) *Attorney, Agent, or Firm* — Eversheds Sutherland (US) LLP

(57) ABSTRACT

A computer implemented method and system for comparing data in an electronic dataset includes creating an electronic of the electronic data. A comparison request is received, the request indicating a first subset of the plurality of identifier entries of the copy that are to be compared, a second subset of at least one attribute type to be compared for the first subset of identifier entries, and at least one reference identifier entry. For each pair of identifier entry of the first subset and to-be-compared attribute type of the second subset, it is determined whether the attribute entry of the to-be-compared attribute type is logically associated with the reference identifier entry matches the attribute entry of the same attribute type logically associated to the identifier entry of the first subset. The result of the comparison is further stored as an additional attribute entry, which permits visualising of the comparison result.

15 Claims, 23 Drawing Sheets

| Eye Color | Compared: 'Handedness' | | Handedness | Registered? | Vaccinated? | Insurance? | He... | We... |
|---|---|---|---|---|---|---|---|---|
| Gray | | ▶ | Right-Handed | | | ☑ | 207 | 1 |
| Blue | ⊗ FAIL - value of 'Handedness' is not the same among all the entries | ▶ | Right-Handed | ☑ | ☑ | ☑ | 191 | |
| Blue | ⊗ FAIL - value of 'Handedness' is not the same among all the entries | ▶ | Right-Handed | ☑ | ☑ | ☑ | 178 | |
| Blue | ⊗ FAIL - value of 'Handedness' is not the same among all the entries | ▶ | Left-Handed | ☑ | ☑ | ☑ | 192 | |
| Brown | ⊗ FAIL - value of 'Handedness' is not the same among all the entries | ▶ | Left-Handed | ☑ | ☑ | ☑ | 207 | |
| Brown | ⊗ FAIL - value of 'Handedness' is not the same among all the entries | ▶ | Right-Handed | ☑ | ☑ | ☑ | 174 | |
| Blue | ⊗ FAIL - value of 'Handedness' is not the same among all the entries | ▶ | Right-Handed | ☑ | ☑ | ☑ | 178 | |
| Blue | ⊗ FAIL - value of 'Handedness' is not the same among all the entries | ▶ | Right-Handed | ☑ | ☑ | ☑ | 193 | |
| Hazel | ⊗ FAIL - value of 'Handedness' is not the same among all the entries | ▶ | Right-Handed | ☑ | ☑ | ☑ | 167 | |
| Green | ⊗ FAIL - value of 'Handedness' is not the same among all the entries | ▶ | Ambidextrous | ☑ | ☑ | ☑ | 195 | |
| Amber | ⊗ FAIL - value of 'Handedness' is not the same among all the entries | ▶ | Right-Handed | ☐ | ☑ | ☑ | 62 | |
| Green | ⊗ FAIL - value of 'Handedness' is not the same among all the entries | ▶ | Left-Handed | | | | 187 | |

FIG. 12A

| All Comparisons Result | Database Title | C ✗ | Access | ✗ | C ✗ | | C ✗ | Delete Doc... ✗ |
|---|---|---|---|---|---|---|---|---|
| ✗ FAIL - Not all compared values match their master references | Activity Trends (8) | ✗ F- | 2-Reader | ▶ | ✗ F- | | ✗ F- | ☐ |
| ✗ FAIL - Not all compared values match their master references | Activity Trends (8) | ✓ | 0-No Access | ▶ | ✓ | | ✓ | ☐ |
| ✗ FAIL - Not all compared values match their master references | Activity Trends (8) | ✓ | 0-No Access | ▶ | ✓ | | ✓ | ☐ |
| ✗ FAIL - Not all compared values match their master references | Activity Trends (8) | ✓ | 0-No Access | ▶ | ✓ | | ✓ | ☑ |
| ✗ FAIL - Not all compared values match their master references | Activity Trends (8) | ✗ F- | 6-Manager | ▶ | ✗ F- | | ✗ F- | ☐ |
| ✗ FAIL - Not all compared values match their master references | Activity Trends (8) | ✗ F- | 0-No Access | ▶ | ✗ F- | | ✗ F- | ☐ |
| ✗ FAIL - Not all compared values match their master references | Activity Trends (8) | ✓ | 6-Manager | ▶ | ✓ | | ✓ | ☐ |
| ✗ FAIL - Not all compared values match their master references | Activity Trends (8) | ✗ F- | 6-Manager | ▶ | ✗ F- | | ✗ F- | ☑ |
| ✗ FAIL - Not all compared values match their master references | Activity Trends (8) | ✗ F- | 0-No Access | ▶ | ✗ F- | | ✗ F- | ☐ |
| ✗ FAIL - Not all compared values match their master references | signEZ 12.x Gold | ✗ F- | 4-Editor | ▶ | ✗ F- | | ✗ F- | ☐ |
| ✗ FAIL - Not all compared values match their master references | signEZ 12.x Gold | ✗ F- | 6-Manager | ▶ | ✗ F- | | ✗ F- | ☑ |
| ✗ FAIL - Not all compared values match their master references | signEZ 12.x Gold | ✗ F- | 4-Editor | ▶ | ✗ F- | | ✗ F- | ☐ |
| ✗ FAIL - Not all compared values match their master references | signEZ 12.x Gold | ✗ F- | 6-Manager | ▶ | ✗ F- | | ✗ F- | ☑ |

FIG. 16

| | Family Name | | Role | | G... | | A... | | Birthday | | Eye... | | Handedn |
|---|---|---|---|---|---|---|---|---|---|---|---|---|---|
| | Aguirre | Grady | Grandfather | ▼ | M | ▼ | 99 | | 1916-05-11 | | Gray | ▼ | Right-Har |
| | Aguirre | Deborah | Grandmother | ▼ | F | ▼ | 68 | | 1948-03-13 | | Green | ▼ | Right-Har |
| | Aguirre | Hilel | Father | ▼ | M | ▼ | 32 | | 1983-04-07 | | Brown | ▼ | Right-Har |
| | Aguirre | Catherine | Mother | ▼ | F | ▼ | 29 | | 1986-11-04 | | Green | ▼ | Right-Har |
| | Aguirre | Jameson | Son | ▼ | M | ▼ | 13 | | 2002-08-27 | | Blue | ▼ | Right-Har |
| | Aguirre | Rafael | Uncle | ▼ | M | ▼ | 51 | | 1964-08-01 | | Hazel | ▼ | Right-Har |
| | Aguirre | Cleo | Aunt | ▼ | F | ▼ | 45 | | 1970-09-29 | | Brown | ▼ | Right-Har |
| | Aguirre | Jesse | Nephew | ▼ | M | ▼ | 11 | | 2004-10-03 | | Blue | ▼ | Left-Hanc |
| | Aguirre | Hermione | Niece | ▼ | F | ▼ | 9 | | 2006-11-04 | | Blue | ▼ | Ambidext |
| | Albert | Ira | Grandfather | ▼ | M | ▼ | 61 | | 1954-10-08 | | Brown | ▼ | Right-Har |
| | Albert | Deborah | Grandmother | ▼ | F | ▼ | 90 | | 1925-07-24 | | Brown | ▼ | Right-Har |
| | Albert | Basil | Father | ▼ | M | ▼ | 41 | | 1975-02-14 | | Blue | ▼ | Right-Har |
| | Albert | Fiona | Mother | ▼ | F | ▼ | 31 | | 1985-03-06 | | Blue | ▼ | Right-Har |
| | Albert | Chandler | Son | ▼ | M | ▼ | 22 | | 1993-08-27 | | Blue | ▼ | Left-Hanc |
| | Albert | Rinah | Daughter | ▼ | F | ▼ | 7 | | 2008-03-26 | | Blue | ▼ | Right-Har |
| | Albert | Martin | Uncle | ▼ | M | ▼ | 35 | | 1980-05-18 | | Amber | ▼ | Right-Har |
| | Albert | Lara | Aunt | ▼ | F | ▼ | 40 | | 1975-10-04 | | Blue | ▼ | Right-Har |
| | Albert | Louis | Nephew | ▼ | M | ▼ | 1 | | 2014-05-20 | | Brown | ▼ | Right-Har |
| | Albert | Fatima | Niece | ▼ | F | ▼ | 14 | | 2002-02-15 | | Green | ▼ | Right-Har |
| | Alston | Harding | Grandfather | ▼ | M | ▼ | 85 | | 1931-01-09 | | Brown | ▼ | Right-Har |
| | Alston | Chandler | Father | ▼ | M | ▼ | 50 | | 1965-08-27 | | Blue | ▼ | Right-Har |
| | Alston | Quincy | Mother | ▼ | F | ▼ | 39 | | 1976-11-05 | | Gray | ▼ | Right-Har |
| | Alston | Colby | Son | ▼ | M | ▼ | 30 | | 1985-09-06 | | Green | ▼ | Left-Hanc |
| | Alston | Rina | Daughter | ▼ | F | ▼ | 20 | | 1995-08-28 | | Brown | ▼ | Right-Har |
| | Alston | Herrod | Uncle | ▼ | M | ▼ | 54 | | 1951-09-10 | | Gray | ▼ | Right-Har |
| | Alston | Michael | Nephew | ▼ | M | ▼ | 2 | | 2014-03-15 | | Blue | ▼ | Right-Har |
| | Barron | Eugenia | Grandmother | ▼ | F | ▼ | 80 | | 1935-09-08 | | Brown | ▼ | Right-Har |
| | Barron | | Father | | | | | | 1963-01-28 | | Brown | ▼ | Right-Har |
| | Barron | | Mother | | | | | | 1953-07-03 | | Blue | ▼ | Right-Har |
| | Barron | | Son | | | | 31 | | 1984-08-15 | | Gray | ▼ | Right-Har |
| | Barron | Karyn | Daughter | ▼ | F | ▼ | 19 | | 1996-11-14 | | Green | ▼ | Right-Har |
| | Barron | Ross | Uncle | ▼ | M | ▼ | 64 | | 1952-03-07 | | Brown | ▼ | Right-Har |

METHODS AND SYSTEM FOR COMPARING DATA OF AN ELECTRONIC DATASET

RELATED PATENT APPLICATION

The present application claims priority from U.S. provisional patent application No. 62/318,266, filed and entitled "METHOD AND SYSTEM FOR COMPARING DATA DISPLAYED IN A DATASET", the disclosure of which is hereby incorporated by reference in its entirety.

TECHNICAL FIELD

The present disclosure generally relates to data analysis and more particularly concerns a method and system for comparing data displayed in a dataset.

BACKGROUND

Various computer tools for displaying data in the form of a dataset, a grid, a table, a spreadsheet, or the like are currently known in the field. In order to analyze and/or compare large amounts of data within such tools, the traditional approach is to extract the targeted data and then output analysis information by way of a report. This approach presents some drawbacks.

There is thus a need for an improved system for comparing large amounts of data within a data grid.

SUMMARY

According to one aspect, there is provided a method for comparing data in an electronic dataset. The method includes: creating an electronic copy of the electronic dataset, the copy having a set of a plurality of identifier entries, each identifier entry being logically associated with a set of attribute entries, each attribute entry being defined by an attribute type and defining an attribute of an entity identified by the identifier entry; receiving a comparison request indicating a first subset of the plurality of identifier entries to be compared, a second subset of at least one attribute type to be compared for the first subset of identifier entries, and at least one reference identifier entry; for each pair of identifier entry of the first subset and to-be-compared attribute type of the second subset: determining whether the attribute entry of the to-be-compared attribute type logically associated with the reference identifier entry matches the attribute entry of the same attribute type logically associated to the identifier entry of the first subset; outputting the outcome of the determination within a comparison result for the pair of identifier entry and to-be-compared attribute type of the first and second subsets; and storing the comparison result for the identifier entry of the first subset as an additional attribute entry of a new attribute type within the set of attribute entries logically associated with the identifier entry; and subsequent to storing the results of the comparison, visually displaying the set of attribute entries logically associated to each identifier entry.

According to another aspect, there is provided a computer-implemented system for comparing data in an electronic dataset. The system includes at least one data storage device and at least one processor operably coupled to the at least one storage device. The processor is configured for creating an electronic copy of the electronic dataset, the copy having a set of a plurality of identifier entries, each identifier entry being logically associated with a set of attribute entries, each attribute entry being defined by an attribute type and defining an attribute of an entity identified by the identifier entry; receiving a comparison request indicating a first subset of the plurality of identifier entries to be compared, a second subset of at least one attribute type to be compared for the first subset of identifier entries, and at least one reference identifier entry; for each pair of identifier entry of the first subset and to-be-compared attribute type of the second subset: determining whether the attribute entry of the to-be-compared attribute type logically associated with the reference identifier entry matches the attribute entry of the same attribute type logically associated to the identifier entry' of the first subset; outputting the outcome of the determination within a comparison result for the pair of identifier entry and to-be-compared attribute type of the first and second subsets; and storing the comparison result for the identifier entry of the first subset as an additional attribute entry of a new attribute type within the set of attribute entries logically associated with the identifier entry; and subsequent to storing the results of the comparison, visually displaying the set of attribute entries logically associated to each identifier entry.

According to another aspect, there is provided a method for comparing data displayed in a dataset (or "grid"). This method comprises the steps of:
receiving a selection of entries (or "rows") of the dataset;
providing a reference;
comparing the selection with the reference; and
displaying a result of said comparing step, within the dataset.

In some embodiments, the dataset may be presented in the form of a grid, having rows (i.e. entries) and columns (defining the attributes of each entry/row).

In some embodiments, the selection is received by a user's input and/or automatically via a processor calculation (i.e. may be a combination of both). Still depending on embodiments, the reference may be provided by a user's input and/or automatically via a processor calculation (i.e. may be a combination of both).

In some embodiments, the displaying comprises graphically displaying each result of the comparing step, in visual association with the corresponding entry having been compared. In some embodiments, the result may be displayed in a distinct column adjacent to the column of the data being compared. Additionally or alternatively, the result may color code the data being compared and/or result information displayed in the grid.

In some embodiments, each entry comprises one or more attribute(s). The comparing comprises providing a comparison attribute from the available attribute(s) and comparing each entry of the selection with the reference. If a value of the comparison attribute is identical to a value of the reference, the result of the comparison is a positive indication; and if a value of the comparison attribute is different from a value of the reference, the result of the comparison is a negative indication.

In some embodiments, the reference comprises a value or a set of values. More particularly, the reference comprises a plurality of reference values corresponding to respective attributes of the entries. The comparing step comprises comparing respective reference values with respective attributes of each entry. The displaying step comprises graphically displaying each result of the comparing step, in visual association with the corresponding attribute of each entry having been compared. In some embodiments, the displaying step further comprises displaying a general result, in visual association with the entry having been compared, wherein the general result indicates whether or not all compared attributes are identical to the corresponding set of values of the reference.

In some embodiments, the method further comprises receiving an attribute to be compared, in terms of uniformity of all entries for that attribute. The reference corresponds to a criterion of all values of the attributes among the selected entries being identical. In the comparing step, if all the values of the attributes among the selected entries, a positive indication is output as the result; and if at least 2 of the values of the attributes among the selected entries are different, then a negative indication is output as the result of the comparison. In the displaying step, each result of the comparing step is displayed in visual association with the corresponding attribute of each entry having been compared.

In some embodiments, the step of providing a reference comprises setting said reference to correspond to a value having the highest occurrence among the selected entries, for a given attribute.

In some embodiments, the reference comprises a set of values for a given attribute, the individual values in the value set corresponding to family members. In the comparing step, one or more group(s) of entries among the selection are compared with family members of the reference. For each group among the entries of the selection: (i) if a value of the comparison attribute is found among the family members of the reference, then a positive indication is output as the result of the comparison; (ii) if a value of the comparison attribute is not found among the family members, then an "extraneous" indication is output as said result of the comparison; and (iii) if a family member of the reference is missing among the values of the attribute for the group of entries being compared, then a "missing" indication is output as the result of the comparison.

According to another aspect, there is provided a system for comparing data displayed in a dataset (or "grid"), the system comprising:
 a memory for storing the dataset;
 an input port for receiving a selection of entries (or "rows") of the dataset;
 a processor for comparing the selection with a reference; and
 a user interface for displaying the result of said comparing, within the dataset.

The present invention is advantageous, in that the method and system displays the comparison results within the dataset containing the data being compared, thereby simplifying the user experience for comparing the data.

Other features and advantages of the invention will be better understood upon reading of preferred embodiments thereof with reference to the appended drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 3 illustrates a visual representation of the electronic copy of the electronic dataset according to an embodiment;

FIG. 9 illustrates a visual representation of the electronic copy for making selections for comparison, in accordance with an embodiment.

FIG. 10D illustrates a visual representation of the electronic copy showing comparison results, in accordance with an embodiment.

FIGS. 12A and 12B illustrate visual representations of the electronic copy of a dataset showing comparison results, in accordance with an embodiment.

FIG. 16 illustrates a visual representation of the electronic copy of a dataset, in accordance with an embodiment.

FIG. 17 illustrates a setup dialog box for making selections for comparison, in accordance with an embodiment.

FIG. 18 illustrates a comparison setup dialog box, in accordance with an embodiment.

Figure 1:
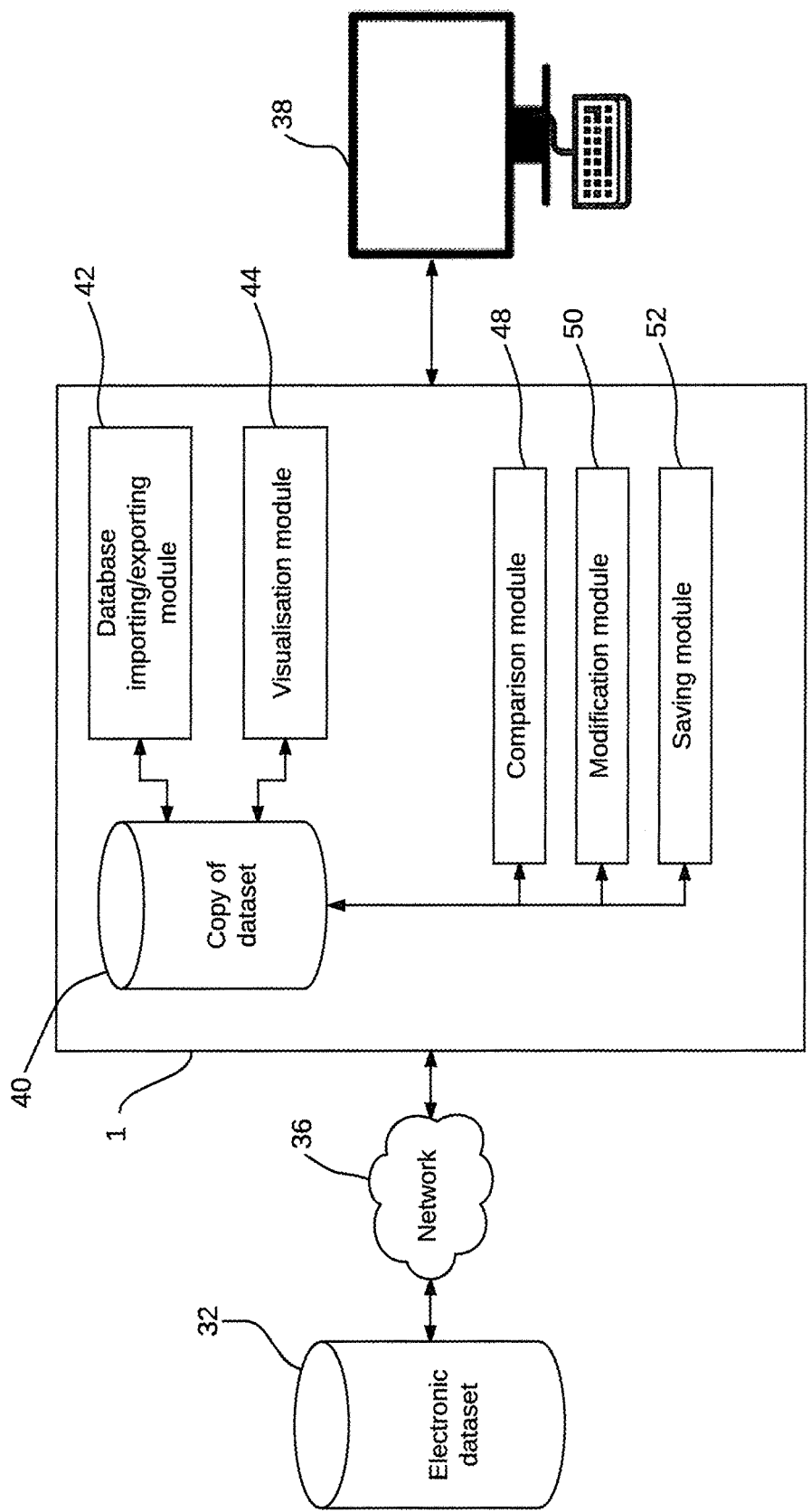
FIG. 1 illustrates a schematic diagram of a system for comparing data in an electronic dataset, in accordance with an embodiment.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

Broadly described, various example embodiments described herein provide for a system and method for comparing data and displaying comparison results in an electronic dataset, in which comparison information is logically and visually associated to the data being compared. Such comparison information may be used for example, in the context of making quantitative analyses, performing statistical analyses, for analyzing large amounts of data and/or the like.

One or more systems and methods described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, wearable device, tablet device, virtual reality devices, smart display devices (ex: Smart TVs), set-top box, video game console, portable video game devices, or virtual reality device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein. In some embodiments, the systems may be embedded within an operating system running on the programmable computer.

"Electronic dataset" herein refers to a set of data entries that are logically organized. The entries of the dataset may be used to define properties of an operation, such as the properties of users within a working environment. The properties can define, for example, different rights or privileges of users. The dataset may be stored as a relational database and may have a database format commonly used in the art, such as Domino, SQL, SCSV, Office 365, or the like. As an organized collection, the electronic dataset may comprise textual information, numeral information, time & date information, image information, or a combination thereof. In the context of managing security access of a family of users, the textual and/or numeral information can be related to the identity, function (i.e. role), characteristics (e.g. handedness, eye color, age, height or the like) of a given user or a group of users.

Referring now to FIG. 1, a schematic diagram of a computer-based system 1 for comparing data in an electronic dataset according to an embodiment is shown. The data comparison system 1 is operable to be connected to a data storage device 32 that stores the electronic dataset to be managed. The data storage device 32 may be a storage device of a mainframe computer or networked-based or cloud-based server.

The data comparison system 1 may be connected to the data storage device 32 via any suitable communications channel. For example, the computing may communicate over the network 36 that is a local area network (LAN or Intranet) or using an external network, such as, the Internet. The data comparison system 1 is operable to receive electronic transmissions from the data storage device 32, including electronic information representative of the electronic dataset.

Continuing with FIG. 1, the data comparison system 1 includes a database importing/exporting module 42 operatively connected to the memory 40. For example, the database importing/exporting module 42 is operable to import the electronic dataset from the data storage device 32 and store an electronic copy of the electronic dataset in a memory device 40 of the data comparison system 1. For example, the memory 40 can be local memory (i.e. within the same device), such as the RAM of the data comparison system 1. Alternatively, the memory 40 can be implemented externally, such as being cloud-based, and in communication with one or more modules of the data comparison system 1.

The "electronic copy of the electronic dataset" herein refers to an electronic set stored within the memory 40 of the data comparison system 1 and that is representative of the information stored within the electronic dataset. The electronic copy can have the same database format as the electronic dataset. Alternative, the electronic copy have a different database format following the importing carried out by the database importing module, but in which the information stored is still representative of the information stored within the electronic dataset. Immediately following the importing of the electronic dataset, the information contained in the electronic copy is the same as the information contained in the electronic dataset.

The database importing/exporting module 42 may also be configured to export the copy of the electronic dataset stored on the computer (i.e. in the memory of the computer) to the data storage device 32. Generally, the database importing/exporting module 42 may be useful to export a modified or updated copy of the electronic dataset from the data comparison system 1 to the data storage device 32.

Figure 2:
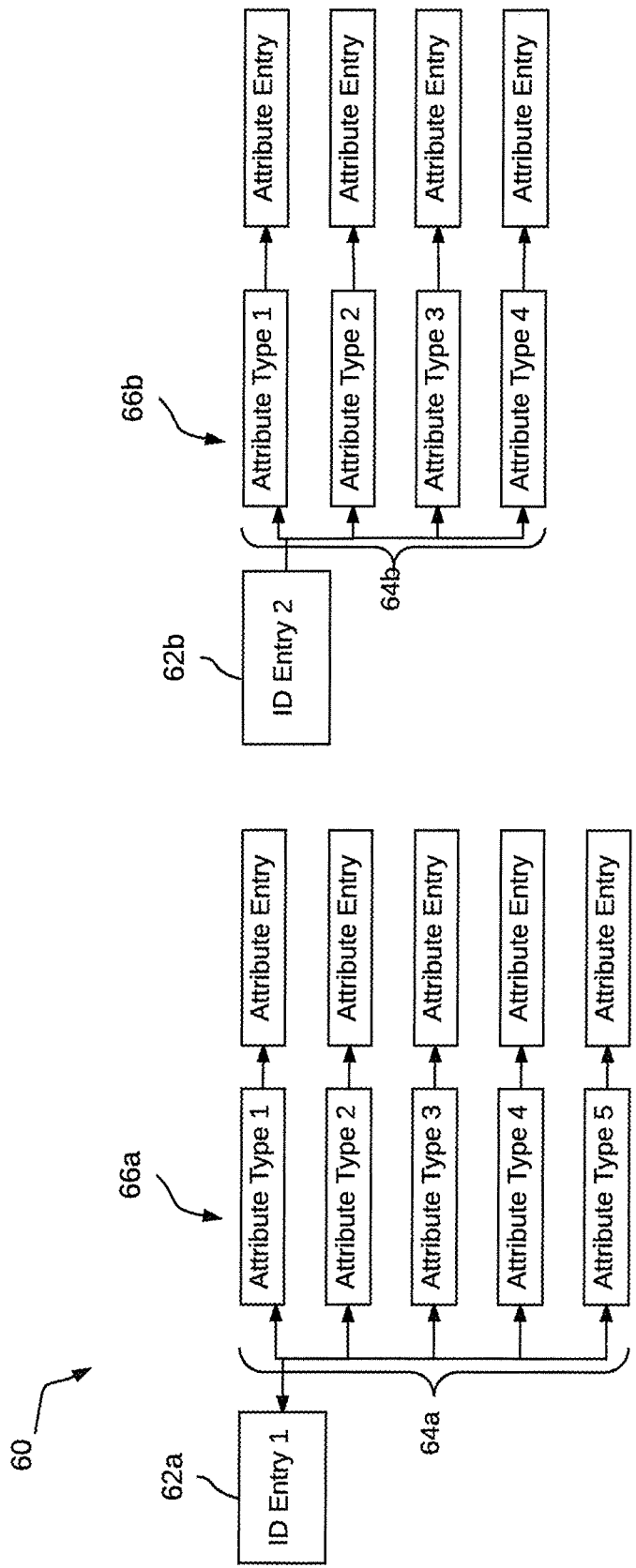
FIG. 2 illustrates a block diagram of a data structure representing the electronic copy according to an embodiment.

Referring now to FIG. 2, therein illustrated is a block diagram of a data structure 60 representing the electronic copy in which identifiers entries and attribute entries are stored. "Identifier entries" represent records of the electronic dataset and identify entities (e.g. users of an operation) for which information is stored within the electronic dataset. The identifier can be considered as being rows of the electronic dataset. In the illustrated example, two identifier entries 62a and 62b are shown.

Each identifier entry 62a, 62b is logically associated to one or more attribute entries 64a, 64b. Attribute entries 64a, 64b logically associated to a given identifier entry store information pertaining to the entity identified by the identifier entry as attribute values. Each attribute entry 64a, 64b may be identified by an attribute type 66a, 66b. The attribute entries 64a, 64b can be considered as being columns of the electronic dataset.

In the illustrated example, the first identifier entry 62a "ID Entry 1" is logically associated with five attribute entries 64a of the types 66a "1", "2", "3", "4" and "5" and a second identifier entry 62b "ID Entry 2" is logically associated with four attribute entries 64b of the types 66b "1", "2", "3", and "4".

Referring back to FIG. 1, the data comparison system 1 also includes a visualization module 44 for visualizing the electronic copy of the electronic dataset stored in the memory 40. The visualization module 44 is operatively connected to the memory 40 and is operable to generate a visual representation of the electronic copy of the electronic dataset. The visual representation is displayed on a display device 38 connected to the data comparison system 1. In one example, the copy of the electronic dataset is displayed (i.e. visually represented) as a collection of rows and columns. Each row may display the attribute entries associated to a given identifier and each column display a given type of attribute entry.

Figure 3:
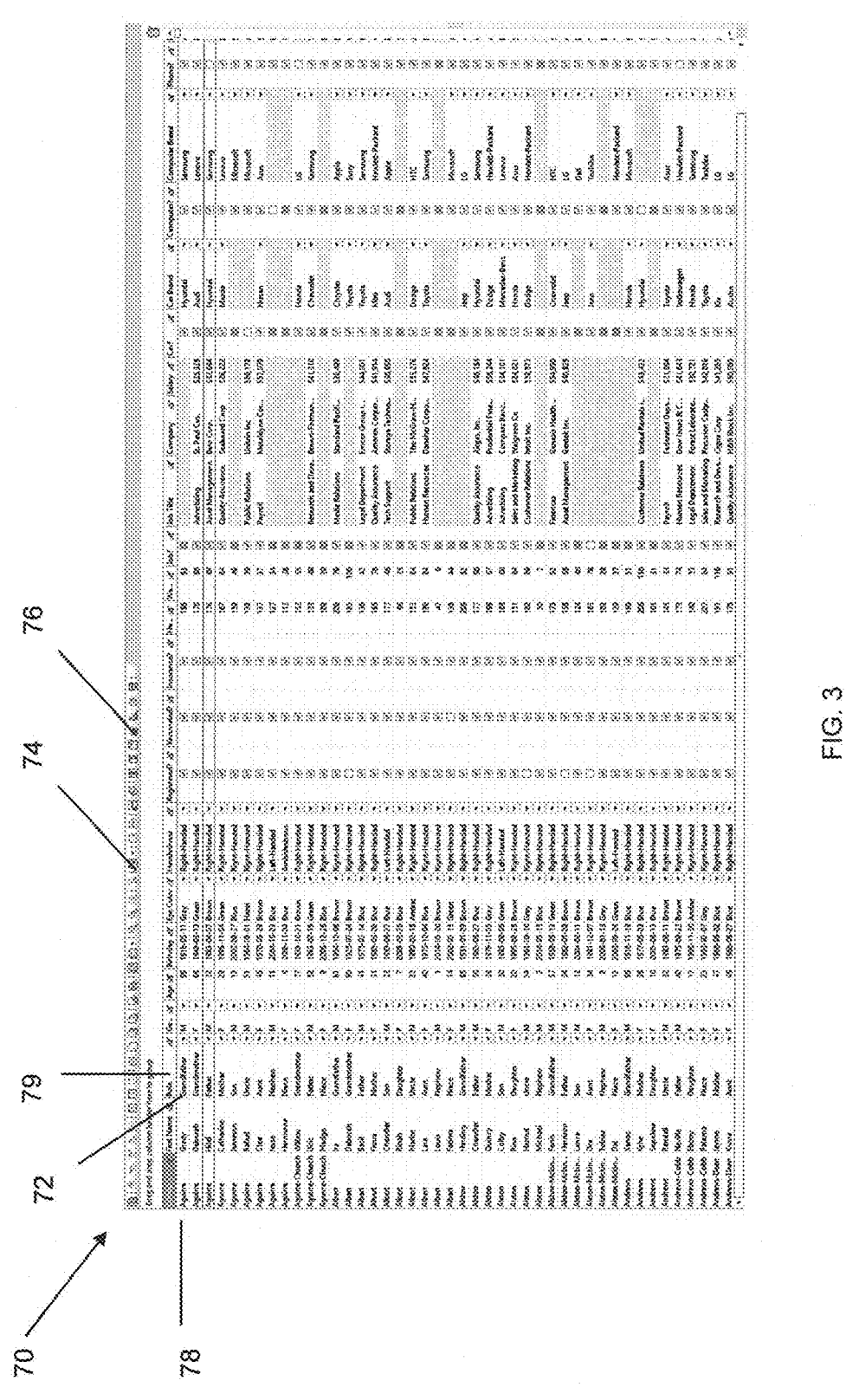

Referring now to FIG. 3, therein illustrated is a visual representation of the electronic copy of the electronic dataset according to one embodiment in the form of a grid 70 having rows and columns. The grid 70 contains data 72 and is typically accompanied by a toolbar 74. The toolbar 74 includes at least one button 76 allowing for interaction by a user. The data 72 contained in the grid 70 is generally designated by a data row 78 and a data column 79. As illustrated, each row corresponds to an identifier entry and each column 79 displays a value attribute entry of a given type associated to the identifier entry.

Referring back to FIG. 1, the data comparison system 1 includes a comparison module 48 that is operable to receive a comparison request. The comparison request may be made by a user interacting with a display device 38 to select the parameters of the comparison to be carried out. The comparison request indicates a first subset of identifier entries that are to be compared. The first subset corresponds to a subset of all the identifier entries in the electronic copy of the electronic subset. As described, a user interacting with the data comparison system 1 can select the subset by making a selection within the visual representation of the electronic copy displayed on the display device 38. Alternatively, the user can define one or more criteria, and identifier entries being associated to attribute entries having values matching the criteria are included in the first subset.

The comparison request further indicates a second subset of at least one attribute type to be compared for the first subset of identifier entries. The second subset indicates which type of attribute entries will be compared amongst the identifier entries.

The comparison request further indicates at least one reference identifier entry. The reference identifier entry corresponds to the identifier entry whose attribute values of the types of the second subset will be compared against.

The comparison submodule 48 is operable to carry out the comparison by comparing for each identifier entry, each attribute entry of the types of the second subset against of the attribute entries of the same type of the reference identifier entry. That is, for each pair of identifier entry of the first subset (other than the reference identifier entry) and to-be-compared attribute type of the second subset, the attribute entry of the to-be-compared attribute type logically associated with the reference identifier is compared with the attribute entry of the same attribute type logically associated to that identifier entry of the first subset to determine whether these two attribute entries form a match.

Two attribute entries can be considered a match if their values are identical. Alternatively, two attribute entries can be considered a match if their normalized (ex: truncated values for numerical values, case-insensitive, etc.) values are the same.

The result of the comparison is outputted as a comparison result for that pair of identifier entry and to-be-compared attribute type of the first and second subsets, the comparison result indicating whether there was a match or not a match.

The comparison is carried out for each pairing of identifier entry of the first subset and to-be-compared attribute type of the second subset against a corresponding attribute entry associated to the reference identifier entry. That is, for each identifier entry of the first subset, a comparison is carried out for each attribute type associated to that entry that is defined within the second subset with the attribute entry of the corresponding type associated to the reference identifier.

The comparison module 48 is further operable to store the comparison results within the electronic copy of the electronic dataset. In particular, the comparison results are stored as additional attribute entries of new attribute types and are logically associated to the corresponding identifier entry that was compared against the reference identifier entry. For example, for a given pair of identifier entry of the first subset and to-be-compared attribute type, when a comparison result is generated from comparing the attribute entry of that type logically associated to that identifier entry against the attribute entry of the same attribute type logically associated to the reference identifier, that comparison result is stored as an additional attribute entry of a new attribute type within the set of attribute entries logically associated with the identifier entry of the pair. The attribute entry that is newly added may further be associated with the attribute entry of the to-be-compared attribute type when stored within the electronic copy. For example, the newly added attribute entry storing the comparison result can include a sub-entry indicating the attribute type that was compared to generate the comparison result.

Figure 4:
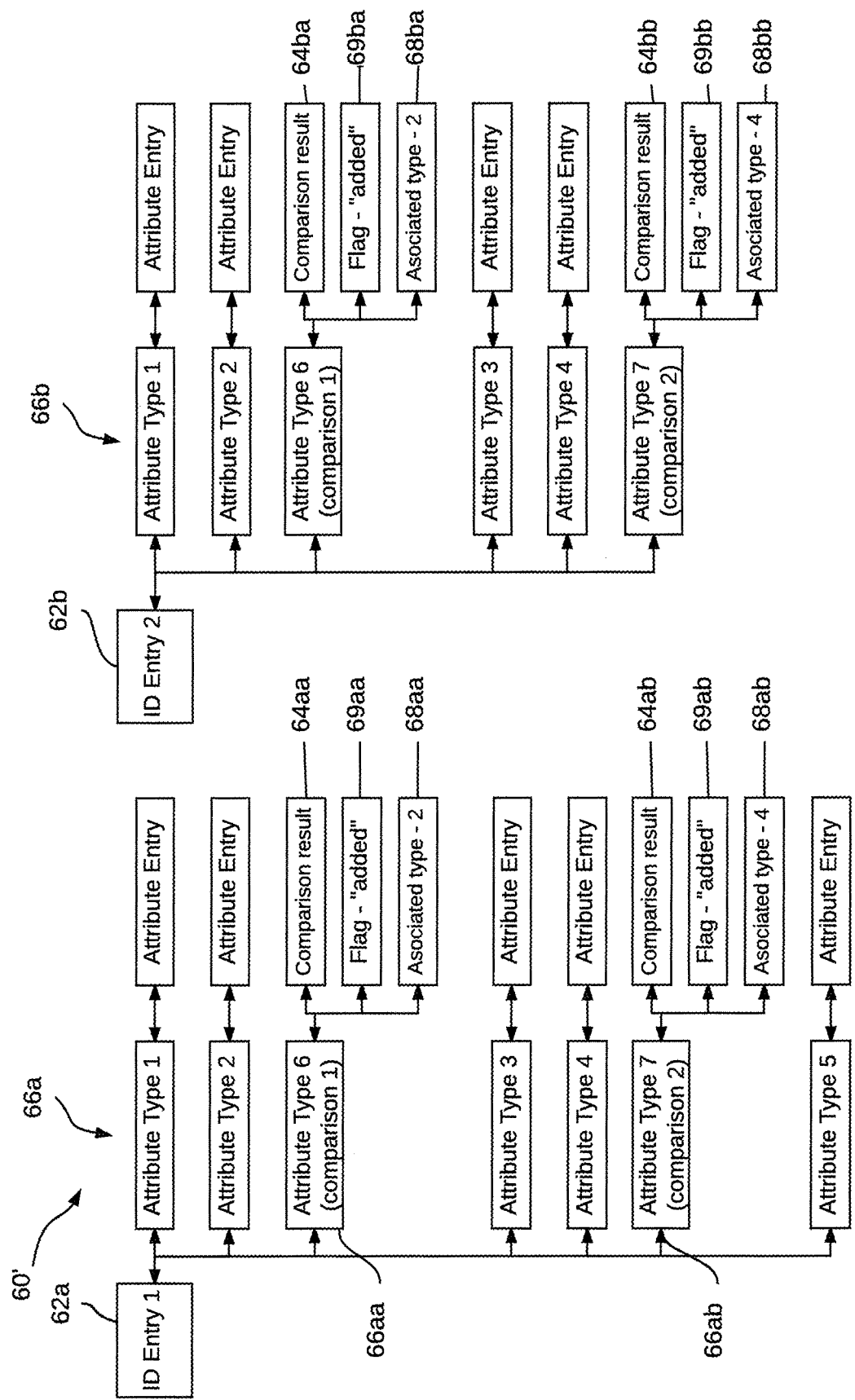
FIG. 4 illustrates a block diagram of a data structure representing the electronic copy after comparisons have been carried out, in accordance with an embodiment.

Referring now to FIG. 4, therein illustrated is a block diagram of the data structure 60' representing the electronic copy after comparisons have been carried out according to an example embodiment. It will be appreciated that the data structure 60' now includes a first new attribute type 66aa denoted as "attribute type 6". A first additional attribute entry 64aa stores the comparison result generated from the comparison. An associated indicator 68aa is also stored with the new attribute type 66aa and indicates that the first new attribute type 66aa is associated to the "attribute type 2" because this comparison result was generated from the comparison of the attribute entry of attribute type "2" for the identifier entry "ID entry 1" with the corresponding attribute entry of attribute type "2" for the reference identifier entry (not shown).

As illustrated in the example, a second new attribute type 66ab denoted as "attribute type 7" is also logically associated to the identifier entry "ID Entry 1" and has associated thereto an attribute entry 64ab storing a comparison result and an associated indicator 68ab indicating that the result is from the comparison of the attribute entry of the type "4".

Attribute entries logically associated to a second identifier entry 62b "ID Entry 2" now has a third additional attribute entry 64ba of the first new attribute type ("attribute type 6") and indicates the comparison result generated from comparing the attribute entry associated of the attribute type "2" with the attribute entry of the corresponding type associated to the reference identifier. The associated indicator 68ba indicates that the comparison result was generated from the comparison of attribute entries of the attribute type "2".

Similarly, a fourth new additional attribute entry 64bb of the second new attribute type ("attribute type 7") is stored and indicates the comparison result generated from comparing the attribute entry associated to the attribute type "4" with the attribute entry of the corresponding type associated to the reference identifier. The associated indicator 68bb indicates that the comparison result was generated from the comparison of attribute entries of the attribute type "4".

According to one example embodiment, as illustrated, each additional attribute entry of a new attribute type each has comparison flag entry associated thereto to indicate that the additional attribute entry was added to the electronic copy as a result of a comparison. For example, each of first, second, third and fourth attribute entries 64aa, 64ab, 64ba and 64bb are logically associated with a respective flag entry 69aa, 69ab, 69ba and 69bb indicating that these attribute entries of new attribute types are stored in logical associated with identifier entries as a result of the comparisons that were carried out.

Subsequent to completing the comparisons of attribute entries in accordance with a comparison request, the visualization module 44 is operated to generate a visual representation of the electronic copy of the electronic dataset having the newly added attribute entries. It will be appreciated that the newly added attribute entries (ex: attribute entries 64aa, 64ab, 64ba and 64bb) are treated by the visualization module 44 in substantially the same way as any other attribute entries (including entries present following importing of the electronic dataset to the electronic copy)

when generating the visual representation. For example, where the visual representation is a collection of rows and columns, the additional attribute entries are displayed as additional columns in the appropriate rows within the visual representation. That is, the newly added attribute entries are visually represented within a single table along attribute entries of electronic copy that were included therein following the initial importing from the electronic dataset.

Figure 5:
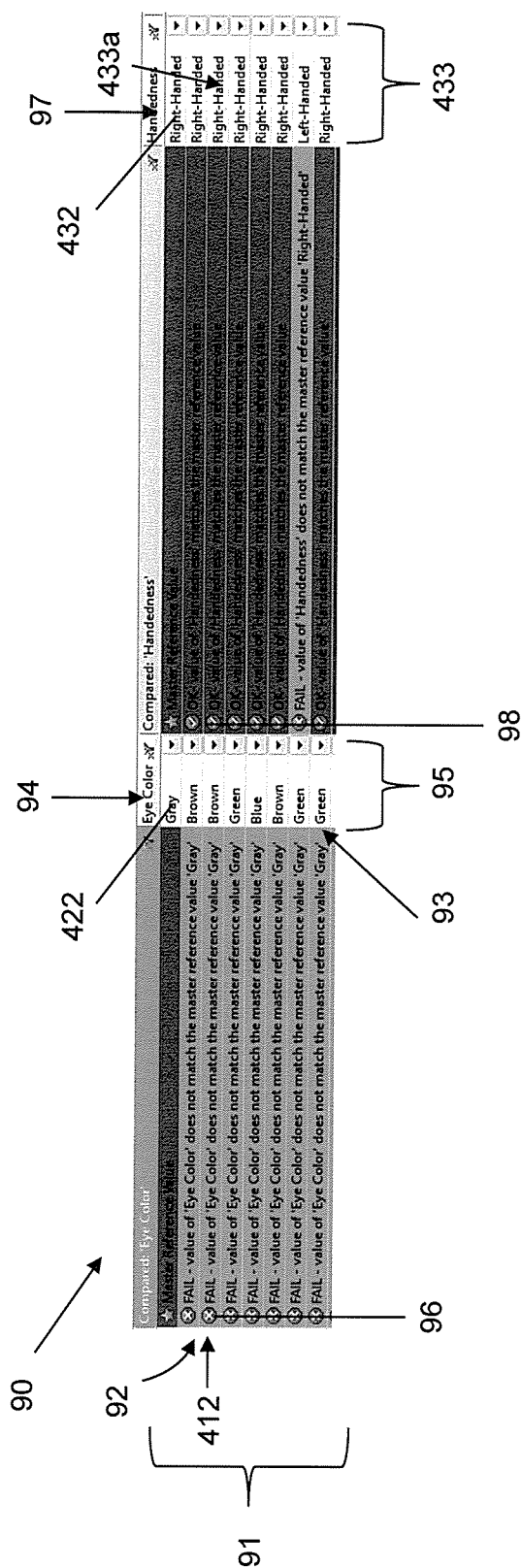
FIG. 5 illustrates a portion of the visual representation of the electronic copy displaying additional attribute entries according to an embodiment.

Referring now to FIG. 5, therein illustrated is a portion of the visual representation of the electronic copy in which additional attribute entries generated from comparisons are visual represented within a grid 90. Rows 91 of entries 92 visual represent the values of attribute entries associated to a plurality of identifier entries. Column 93 correspond to different attribute types. A first column 94 corresponds to the attribute type "Eye color" and values 95 of attribute entries show eye colors "gray", "brown", "green" or "blue". A second column 96 corresponds to the new attribute type "Compared: 'Eye Color'" and the values of these attribute entries represent the result of the comparison of each attribute entry represented in column 96 with the attribute entry of the first row of column 94, which is a reference value. In the illustrated example, each of the attribute entries have values that do not match the value of the "eye color" of the reference entry, and a value "Fail" is visually represented. The visualization module 44 can be configured to recognize that a particular attribute entry was added to the electronic copy as a result of a comparison that was carried out. This recognition can be based on identifying the comparison flag entry (ex: 68aa, 68ab, 68ba, 68bb) associated to the additional attribute entries. The visualization module 44 can be further configured to visually represent positive and negative comparison results differently, such as using different colors.

Continuing with the example of FIG. 5, a third column 97 corresponds to the attribute type "handedness" having values "right-handed" or "left-handed". A fourth column 98 corresponds to the new attribute type "Compared: 'Handedness'" and the values of these attribute entries represent the result of the comparison of each attribute entry represented in column 97 with the attribute entry of the first row of column 97, which is a reference value. In the illustrated example, most of the attribute entries represented in column 97 have values that match the value of the "handedness" of the reference entry, and a value "OK" is visually represented. Values of attribute entries represented in in column 98 are also visually represented differently (ex: with different colors), based on recognizing that attribute entries are added as a result of comparison from the logically associated comparison flag entries (ex: 68aa, 68ab, 68ba, 68bb).

Referring back to FIG. 1, data comparison system 1 further includes a modification module 50 that is operable to receive a modification request. The modification request indicates a to-be-modified identifier entry, which may be one of the identifier entries of the first subset that was compared. The modification request further indicates a to-be-modified attribute type, which may be at least one attribute type of the second subset. Accordingly, the modification request defines the attribute entry to be modified, that attribute entry being the one having the to-be-modified attribute type and being logically associated to the to-be-modified identifier entry. The modification request also indicates a modifier attribute entry, which is the value for modifying the current value of the to-be-modified attribute entry.

The modification request can be made by a user interacting with the visual representation of the electronic copy displayed on the display device 38. For example, within the displayed grid of rows and columns, the user can select a cell representing a particular attribute entry of the electronic copy and enter the value of the modifier attribute entry (ex: by typing the new value, or by selecting a value from a list of permitted values, such as by using a drop-down list).

The modification module 50 is further operable to modify the value of the to-be-modified attribute entry of the to-be-modified attribute type and logically associated to the to-be-modified identifier entry according to the value of the modifier attribute entry. For example, the value of that modifier attribute entry is replaced by the value defined in the modifier attribute entry.

Figure 6:
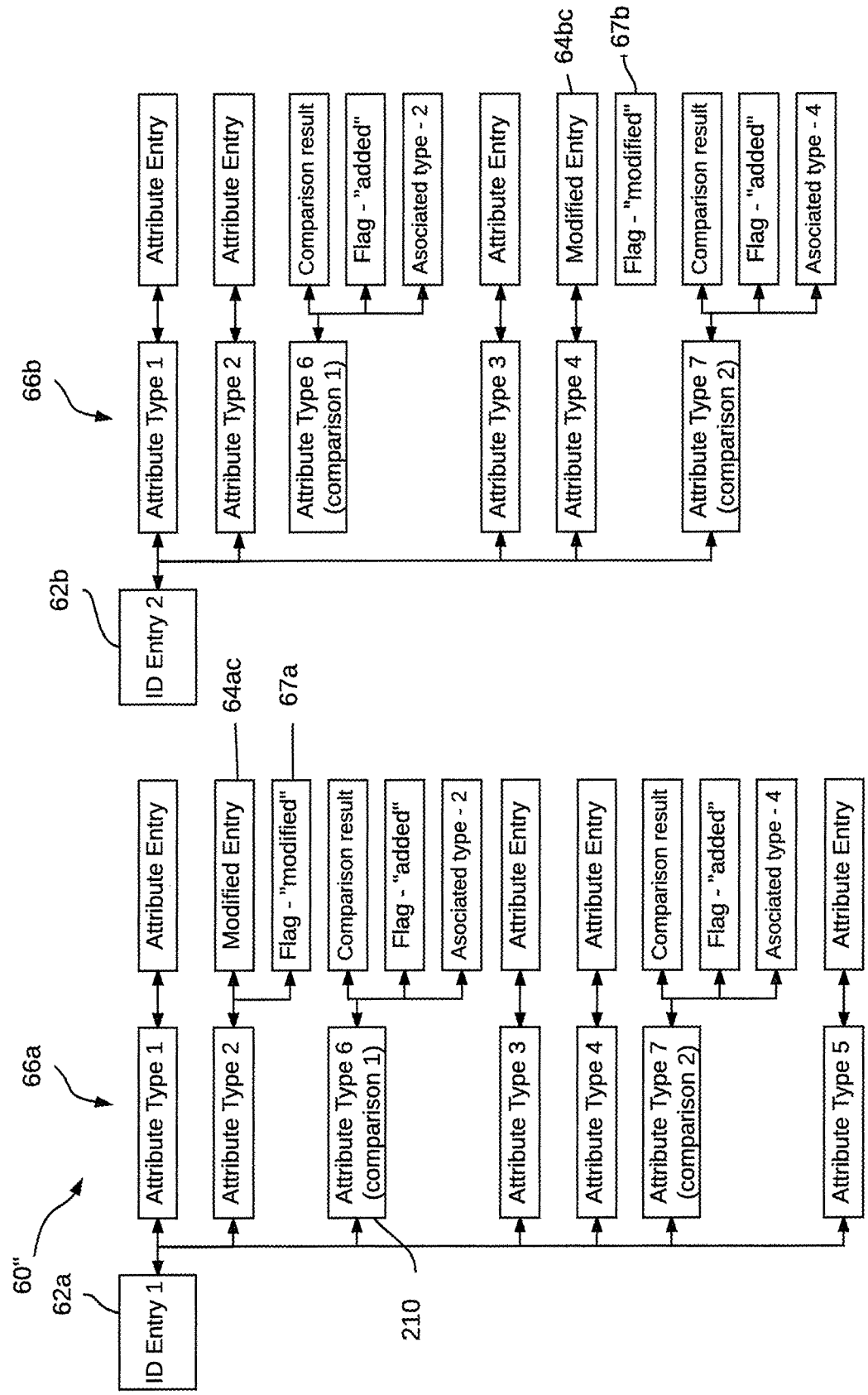
FIG. 6 illustrates a block diagram of a data structure representing the electronic copy after modification one or more attribute entries, according to an embodiment.

Referring now to FIG. 6, therein illustrated is a block diagram of the data structure 60" representing the electronic copy after one or more attribute entries have been modified in response to one or more modification requests received at the modification module 50, according to an example embodiment. It will be appreciated that the attribute entry 64ac of the attribute type "2" and logically associated to ID entry 1 62a within the data structure has been modified with the value of the modifier attribute entry of a modification request for modifying that attribute entry. Similarly, the attribute entry 64bc of the attribute type "4" and logically associated to ID entry 2 62b within the data structure has been modified with the value of the modifier attribute entry of the modification request for modifying that attribute entry.

According to one example embodiment, an attribute entry that has been modified is further associated to a modified flag entry to denote that that attribute entry has been modified in response to a modification request. In the example illustrated in FIG. 6, a first modified flag entry 67a is stored within the electronic copy and logically associated to the attribute entry 64ac to denote that that the attribute entry 64ac has been modified in response to a modification request and a second modified flag entry 67b is stored within the electronic copy and logically associated to the attribute entry 64bc to denote that the second attribute entry 64bc has been modified in response to another modification request.

According to one example, upon modifying the attribute entry of the to-be-modified attribute type and logically associated to the to-be-modified identifier entry according to the modifier attribute entry, such as by replacing the value of that attribute entry with the value of the modifier attribute entry defined in the modification request, the comparison module 48 is configured to carry out another comparison for that attribute entry with the attribute entry of the corresponding type associated to the reference identifier entry. The result of this further comparison is stored within the additional attribute entry in the electronic copy for tracking the comparison. Furthermore, the visualization module 44 can be configured to, upon the further comparison being completed, update the visual representation of the electronic copy. It will be appreciated that the visual representation of the additional attribute entry showing the comparison result following the modification of the to-be-modified attribute entry is also updated, which allows a user to immediately see the comparison result of the modification on the display device 38.

Referring back to FIG. 1, the data comparison system 1 further includes a saving module 52 that is operable to receive a saving request. The saving module 52 is operable to generate an intermediate copy of the electronic dataset from the electronic copy 40, this intermediate copy being provided to the database importing/exporting module 42 for updating the electronic dataset 32. The intermediate copy reflects any modifications made to the electronic copy, such as from modification requests, while omitting extraneous information not applicable for updating the electronic dataset 32.

For example, additional attribute entries stored in the electronic copy for tracking results of comparisons and permit visualization of these results are considered extraneous because these attribute entries do not correspond to any actual data in the electronic dataset. Accordingly, additional attribute entries in the electronic copy 40 are omitted when generating the intermediate copy for exporting. For example, the saving module 52 is configured to identify attribute entries within the electronic copy 40 that are associated to a comparison flag (69aa, 69ab, 69ba, 69bb) and omit these when generating the intermediate copy for exporting.

The saving module 52 may be configured to identify attribute entries within the electronic copy that are associated to modified flag entries denoting that these attribute entries were modified in response to a modification request. At least these attribute entries are included in the intermediate copy for exporting, so that the electronic dataset is updated to reflect modifications made to attribute entries in response to modification requests.

According to one example, the intermediate copy generated by the saving module 52 from the electronic copy corresponds to the whole electronic copy with the modified attribute entries, but having all additional attribute entries removed.

According to an alternative example, the intermediate copy generated by the saving module 52 from the electronic copy is a sparse set of attribute entries formed only of those modified attribute entries of the electronic copy while omitting all other attribute entries (which include attribute entries not modified by modification request and additional attribute entries stored from carrying out attribute comparisons).

The database importing/exporting module 42 is further configured to export the intermediate copy generated by the saving module 52 so that modifications to attribute entries of the electronic copy 40 at the data comparison system 1 are also appropriately stored within the electronic dataset. It will be appreciated that while the electronic copy 40 is changed from responding to comparison requests to add additional attribute entries and responding to modification request to modify attribute entries, pertinent changes are only applied to the electronic dataset when a saving request is received. Before the saving request, the changes are made in the electronic copy only. Furthermore, changing the electronic copy 40 to add additional attribute entries storing the comparison results facilitates visualisation of these comparison results within a single table with other attribute entries. By appropriately flagging the additional attribute entries, they are omitted when exporting the electronic copy 40 to the electronic dataset, thereby ensuring the fidelity of the electronic dataset.

Figure 7:
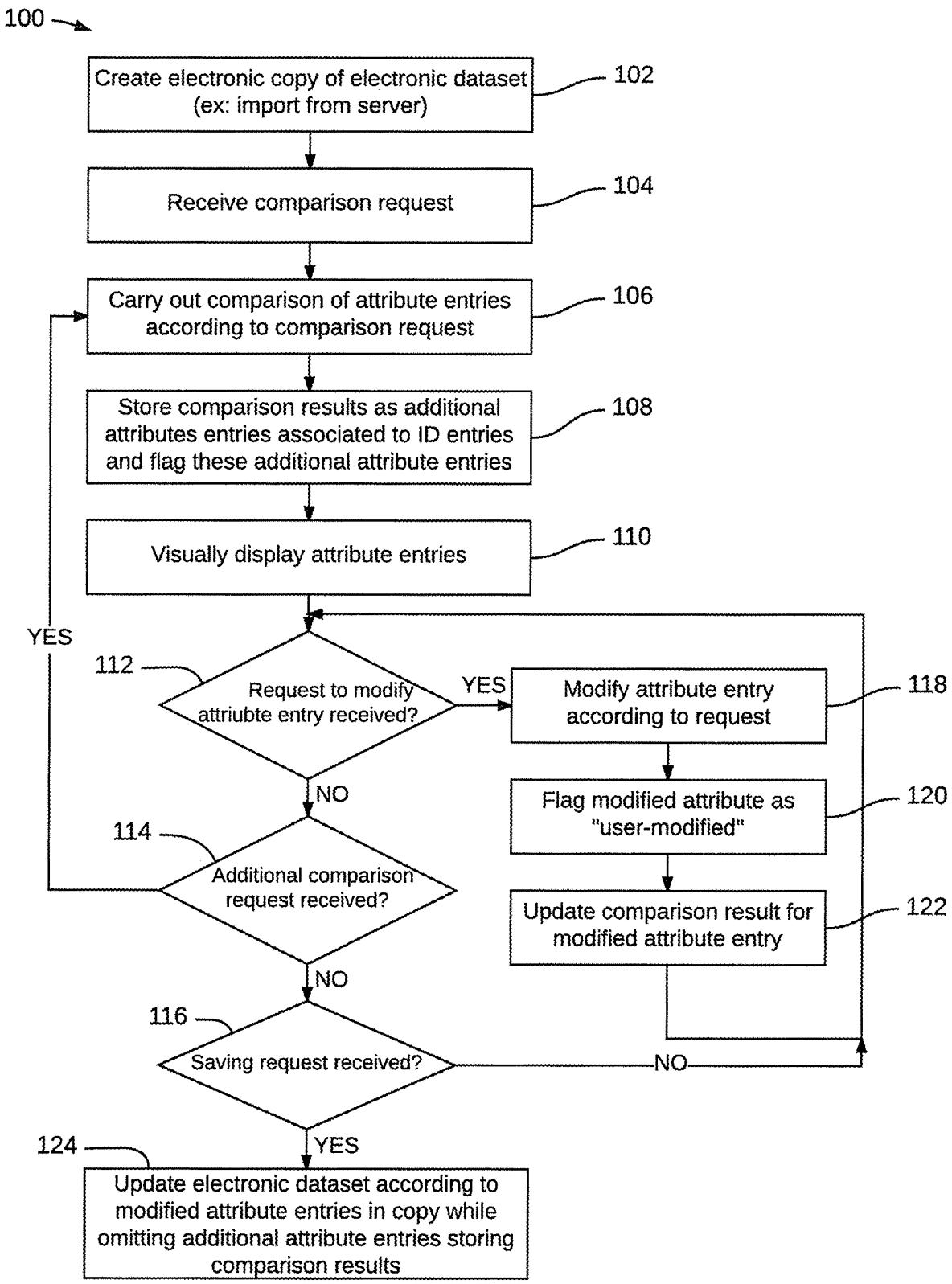
FIG. 7 illustrates a flow chart of a computer-based method for comparing and modifying data of an electronic data set according to an embodiment.

Referring now to FIG. 7, therein illustrated is a flow chart of a computer-implemented method 100 for comparing and modifying data in an electronic dataset according to an embodiment. For example, the comparing and modifying is performed by the computer-implemented data comparison system 1.

At step 102, an electronic copy 40 of the electronic dataset 32 is created. As previously described, the copy of the electronic dataset includes a set of a plurality of identifier entries and each identifier entry is logically associated with a set of attribute entries. Each attribute entry is defined by an attribute type and defines an attribute of an entity identified by the identifier entry.

In some embodiments, the step 102 includes a sub-step of importing the electronic copy of the dataset from the data storage device 32, for example, by the database importing/exporting module 42. Optionally, the electronic copy of the dataset may be imported from an external server. Optionally, the electronic copy of the dataset may be saved locally in the memory 40. The step of importing the electronic copy may be carried in accordance with the description provided herein with reference to the importin/exporting module 42.

At step 104, a comparison request is received. The comparison may be, for example, requested by a user interacting with the display device.

Figure 8:
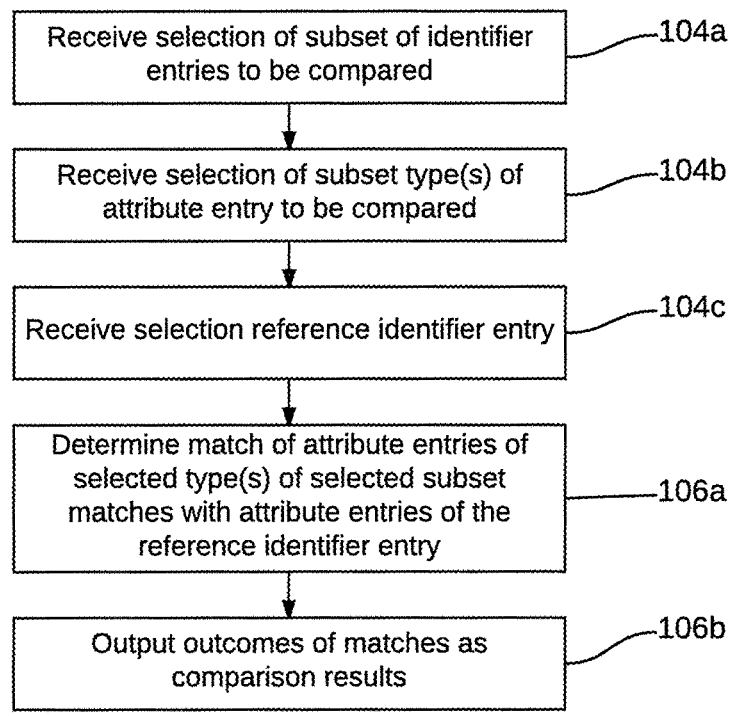
FIG. 8 illustrates a flow chart of a computer-based method for receiving a comparison request and carrying out the comparison according to an embodiment.

Referring now to FIG. 8, therein illustrated is a flow chart of a computer-based method 100 for receiving a comparison request of step 104 and carrying out the comparison at step 106 in accordance with the request according to an embodiment. Generally described, the step of receiving 104 a comparison request includes sub-steps of: indicating a first subset of the plurality of identifier entries to be compared, indicating a second subset of at least one attribute type to be compared for the first subset of identifier entries, and indicating at least one reference identifier entry. The step of receiving 104 a comparison request may be made, for example, by the visualization module 44 and/or comparison module 48 tracking interactions made by the user via the user interface displayed on the display device 38.

At sub-step 104a, a selection of a first subset of identifier entries to be compared is received.

At sub-step 104b, a selection of a second subset of one or more types of attribute entry to be compared is received.

At sub-step 104c, a selection of at least one reference identifier entry is received.

Referring back to FIG. 7, at step 106, the comparison is carried according to the comparison request. The steps 104 and 106 may be carried out, for example, by the comparison module 48 in accordance with description provided herein with reference to the comparison module 48.

Referring to FIG. 8, the step of carrying out the comparison may include for each pair of identifier entry of the first subset and to-be-compared attribute type of the second subset, determining at sub-step 106a, whether the attribute entry of the to-be-compared attribute type logically associated with the reference identifier entry matches the attribute entry of the same attribute type logically associated to the identifier entry of the first subset.

At sub-step 106b, the outcome of the determination is outputted within a comparison result for the pair of identifier entry and to-be-compared attribute type of the first and second subsets.

Referring back to FIG. 7, at step 108, results of the comparisons are stored as additional attribute entries of new attribute types within the set of attribute entries logically associated with the identifier entry. That is, these additional attribute entries are stored within the electronic copy of the electronic dataset.

At step 110, the attribute entries of the electronic copy, including additional attribute entries stored at step 108 are displayed within a visual representation. For example, the visual representation may be generated and displayed in accordance with the description provided herein with reference to the visualization module 44.

At step 112, it is detected whether a modification request has been received. As described elsewhere herein, a modification request indicates a to-be-modified identifier entry, a to-be-modified attribute type and a modifier attribute entry. For example, the to-be-modified identifier entry may be one of the identifier entries of the first subset, and the to-bemodified attribute type may be one of the at least one attribute type of the second subset.

If a modification request has been received, the method proceeds to step 118 to modify the attribute entry of the electronic copy logically associated to the to-be-modified identifier entry and of the to-be-modified attribute type with the modifier attribute entry defined within the modification request.

At step 120, a modified flag entry may optionally be stored in association with the modified attribute entry to indicate that the entry has been modified.

At step 122, the comparison result corresponding to the modified attribute entry may optionally be updated. This may involve updating the additional attribute entry storing the comparison result.

The treatment of the modification request may be carried out in accordance with the description provided herein with reference to the modification module 50.

If a modification request is not received, the method proceeds to step 114 to detect whether an additional comparison request has been received. If another comparison request has been received, the method returns to step 106 to carry out comparison according to the additional comparison.

If an additional comparison is not received, the method proceeds to step 116 to determine whether a saving request has been received. If a saving request is not received, the method continues monitoring for receiving of a modification request, additional comparison request or saving requests.

If a saving request is received, the method 100 proceeds to step 124 to update the electronic database in accordance with modifications made to the electronic copy. The treatment of the saving request may be carried in accordance with the description provided herein with reference to the saving module 52. For example, the electronic dataset is updated according to modifications made to attribute entries within the electronic copy from modification requests while omitting additional attribute entries stored in the electronic copy as a result of carrying out attribute comparisons.

Referring back to FIG. 1, the modification module 50 may be useful to modify (change) some properties of entries (i.e. identifier entries, attributes entries, or a combination thereof) in the electronic copy dataset. The modifications are made to the electronic copy of the dataset stored in the memory 40.

Once the comparison and/or modification of the dataset is/are done, the saving module 52 may be used to save the modifications onto the server where the source dataset is stored (i.e. the data storage device 32). More particularly, the saving module 52 identifies which elements of the electronic copy of the dataset were user-modified, in which case a corresponding entry in the source copy of the dataset is updated in accordance with the user modifications. As previously described, additional attribute entries that were added from the comparison may be identified with a special flag, and are ignored (i.e. omitted) when reverting the electronic copy back to the source copy of the dataset.

The visualization module 44 may also display an icon to identify an entry which has been modified. Alternatively, the entry may be highlighted using, for example, a color code.

The data comparison system 1 also comprises a user device 38. The user device 38 may act as a user interface, and may be embodied, for example, by one or more component(s) allowing a user to interact with the system 1. In the illustrated embodiment, the user device 38 includes a display. Optionally, the user device 38 may also comprise a keyboard, a mouse, a monitor, and/or any other suitable component allowing the user to interact with the system. Alternatively, the user device 38 could be a smart phone, a tablet, or the like.

The data comparison system 1 described in the present description is advantageous in that the results of the comparison are added as additional attribute entries in the local electronic copy of the electronic dataset, so that the visualization module 44 can easily and visually present all of the entries, including the additional attribute entries generated as a result of comparisons carried, without additional modification to the visualization tool. The additional attribute entries are visually represented as additional columns, which allows the user to easily visualize the results of the comparisons and identify incoherencies. The additional columns can be manipulated in the same way as any other column of the visually presented dataset. The use of additional flag(s) allows parsing of which entries of the electronic should be used to update a corresponding entry in the electronic dataset, and to identify where columns have been added due to comparison and should be omitted.

The data comparison system 1 may be useful, for example, for managing the permissions of multiple users when managing access and security of the users, e.g. if an administrator wants to view the electronic dataset for managing all the accesses of security of the users, and determine whether each of the permissions for a family of users are the same or coherent, given a family of users. Where one user has specific permissions that are incoherent with the remainder of users in that same family, the administrator can then modify these specific securities access permissions so that they are coherent with the rest of the users in that family. The data comparison system 1 may also be used for managing a database, and in particular, to be able to visualize entries of the database, visually identify incoherencies between entries of multiple properties that are displayed in columns, and allow the user to react in real-time to address an incoherency. The data comparison system 1 may be used to identify when particular entries have values that are different from a reference value of a reference entry.

EXAMPLES

The system and method disclosed in the present description may be used for various applications, referred in the following as "examples".

In one example (referred to as "regular comparison"), illustrated in FIGS. 9 and 10A-D, the electronic copy of the data set may be visually represented as a grid 500 and may contain data 510 (i.e. entries), designated by a data row 512 (identifier entry) and a data column 514 (attribute entry). Each data column 514 is associated with an attribute type 530. A selection of data rows 520 may be made in order to determine which data 510 should be compared. The electronic copy of the data set 500 may be accompanied by a toolbar 502 including a button 504. When the selection is completed, the user may click a button 504 included in the toolbar 502 accompanying the grid 500, in order to initiate a comparison.

When the user clicks the button 504, a comparison setup dialog box 600 is displayed. The comparison setup dialog box 600 comprises a column selection area 610, a columns-to-compare area 620, a family definition area 630, a member definition area 640, a reference(s) selection area 650 and a background color(s) selection area 670.

The column selection area 610 comprises a list of columns 612 (attribute types) that are available for comparison within the grid. To select a column to be compared, the user selects one or more column(s) to be compared 614 and then clicks the button 622 allowing the transfer of the column 614 from the column area 610 to the columns-to-compare area 620. In order to establish a reference for the comparison, the user then selects a reference identifier entry 652 (or reference "row") in a list of available data entries (rows) provided in the references-selection area 650, with a reference value 656 (see FIG. 10A) for the selected column(s) to compare 624. In the background-colors-selection area 670, the user selects colors matching possible results of the comparison steps. In the illustrated embodiments, four colors are used to map four possible outcomes: first color for "not present" 671, second color for "different" 672, third color for "equal" 673, and fourth for "overmatched" 674 (see FIG. 10B). In the options selection area 680 the user may adjust different parameters relevant to results display, such as whether values of attribute entries need to be identical for there to be a match, or whether a match of the displayed values is sufficient. As can be appreciated, several other options may be set by the user through this dialog box 600. The user selects the "OK" button 660 to start the comparison in each entry, between the value in the column to compare 624 (see FIG. 10A) and the value 656 of the reference entry 652.

Figure 10A:
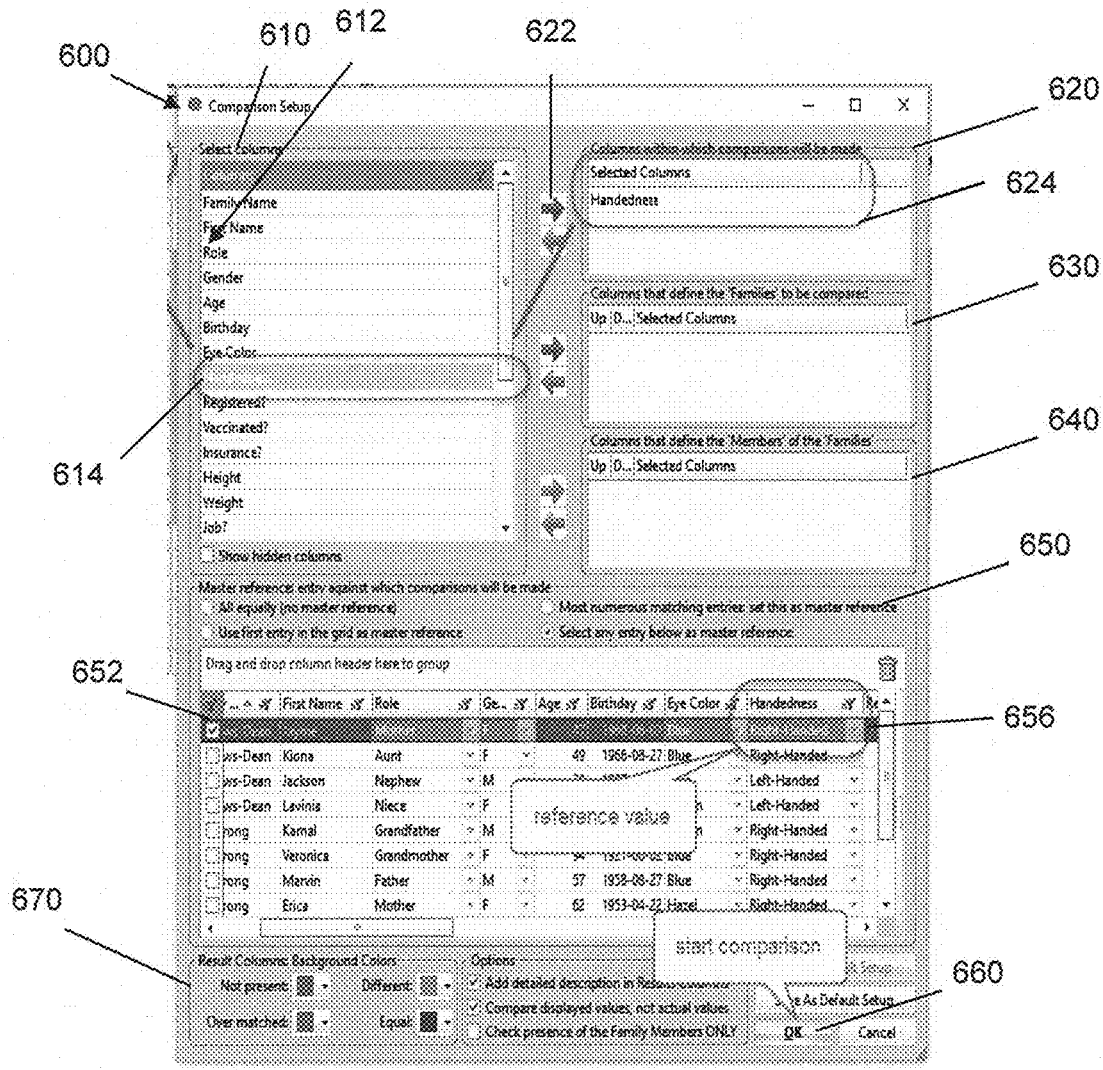
FIGS. 10A to 10C illustrate a comparison setup dialog box and an electronic copy of a dataset, in accordance with an embodiment.
Figure 10B:
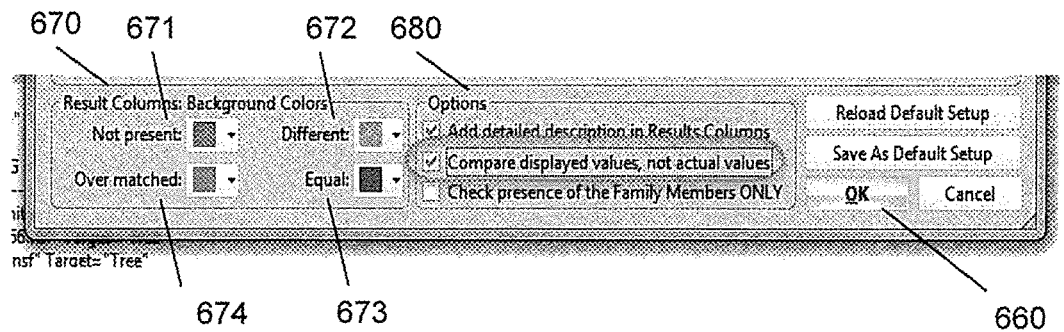
Figure 10C:
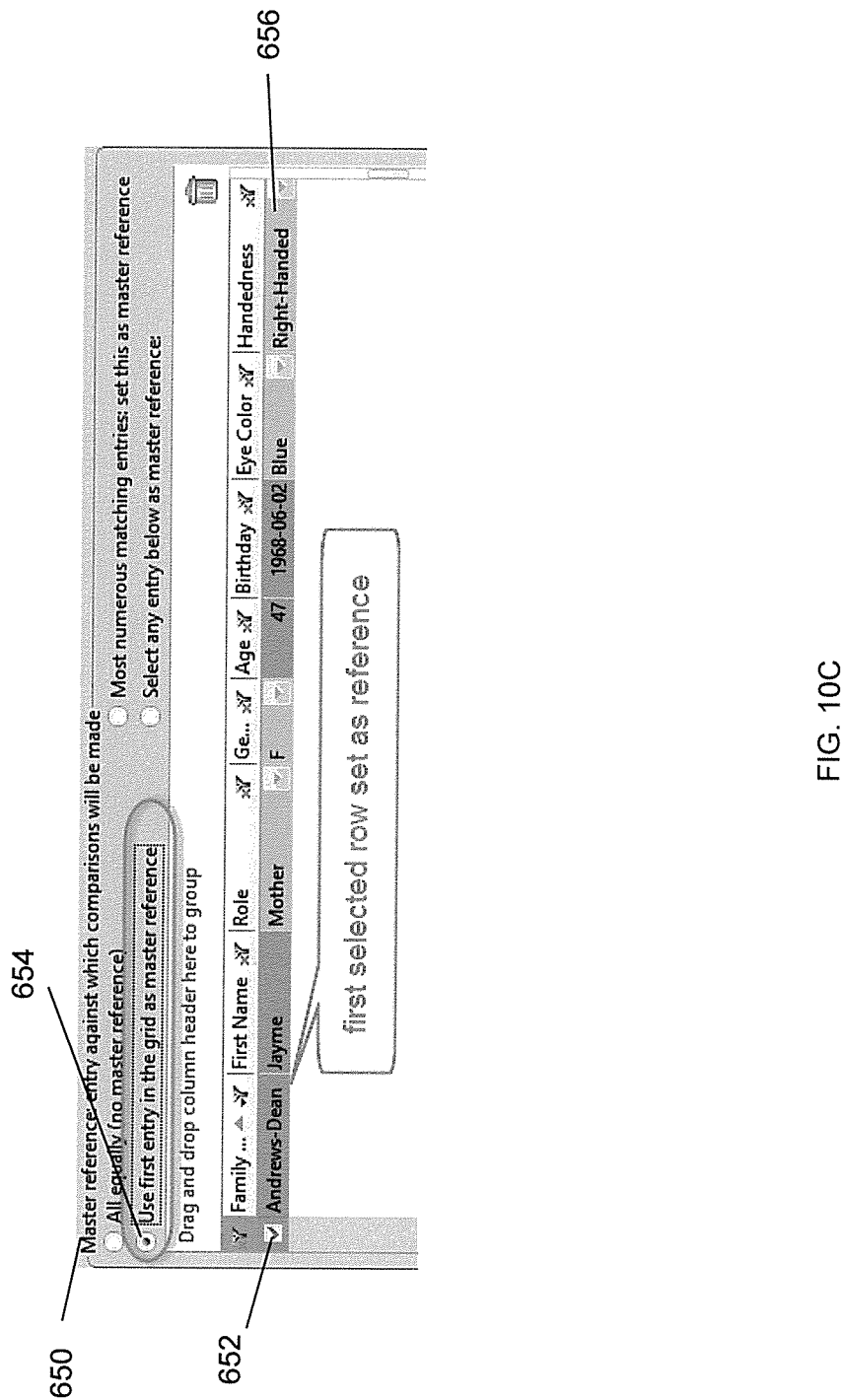

In some embodiments, the user may choose to select the first entry of the grid as reference 652 (see FIG. 10C). In order to do so, the user has to set the first entry as master reference with the option 654.

Broadly described, the regular comparison method includes the following steps that are carried out and/or perceived by the user:
1) Opening the comparator setup dialog box with the button. In the comparator setup dialog box:
   Selecting the columns-to-compare to be compared from the list of columns.
   Selecting the reference listed in the references selection area.
2) Launching the regular comparison method by clicking on the "OK" button 660.
3) Displaying the results within the grid.

Figure 10D:
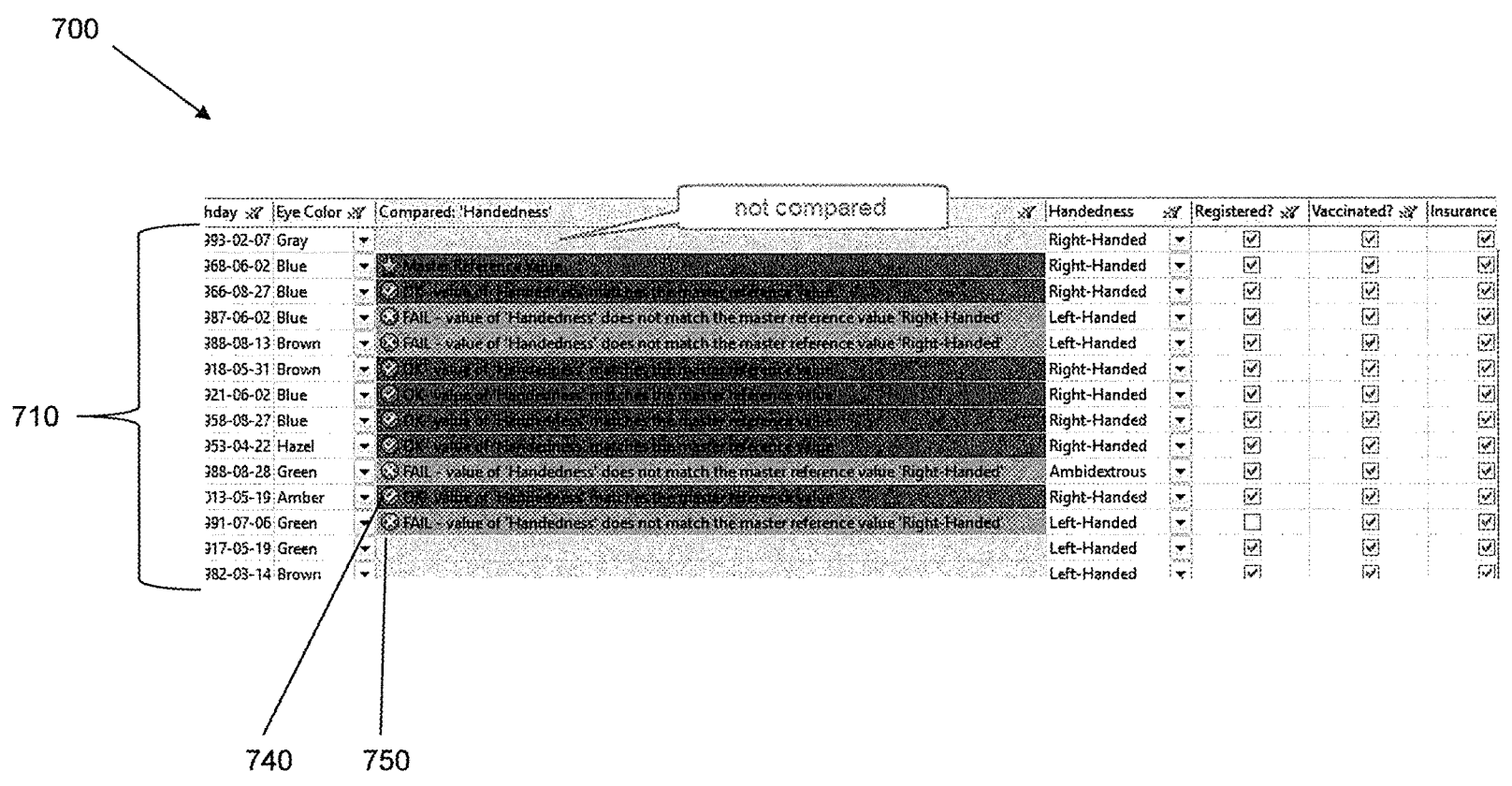

A comparison result in accordance with this embodiment is exemplified in FIG. 10D, where the grid 700 containing data 710 and displaying results 740 and 750 is shown. The grid 700 is similar to the grid mentioned above, except for the properties being different.

In the embodiment illustrated on FIG. 10D, the grid 700 displays the results of the comparison. The results of the comparison are associated to a color code and accompanied by indicators 740 and 750 which indicate that entries are either identical (marked as "OK" with a corresponding icon and highlighted in darker shade) or different (marked as "FAIL" with a corresponding icon and highlighted in lighter shade).

Figure 11:
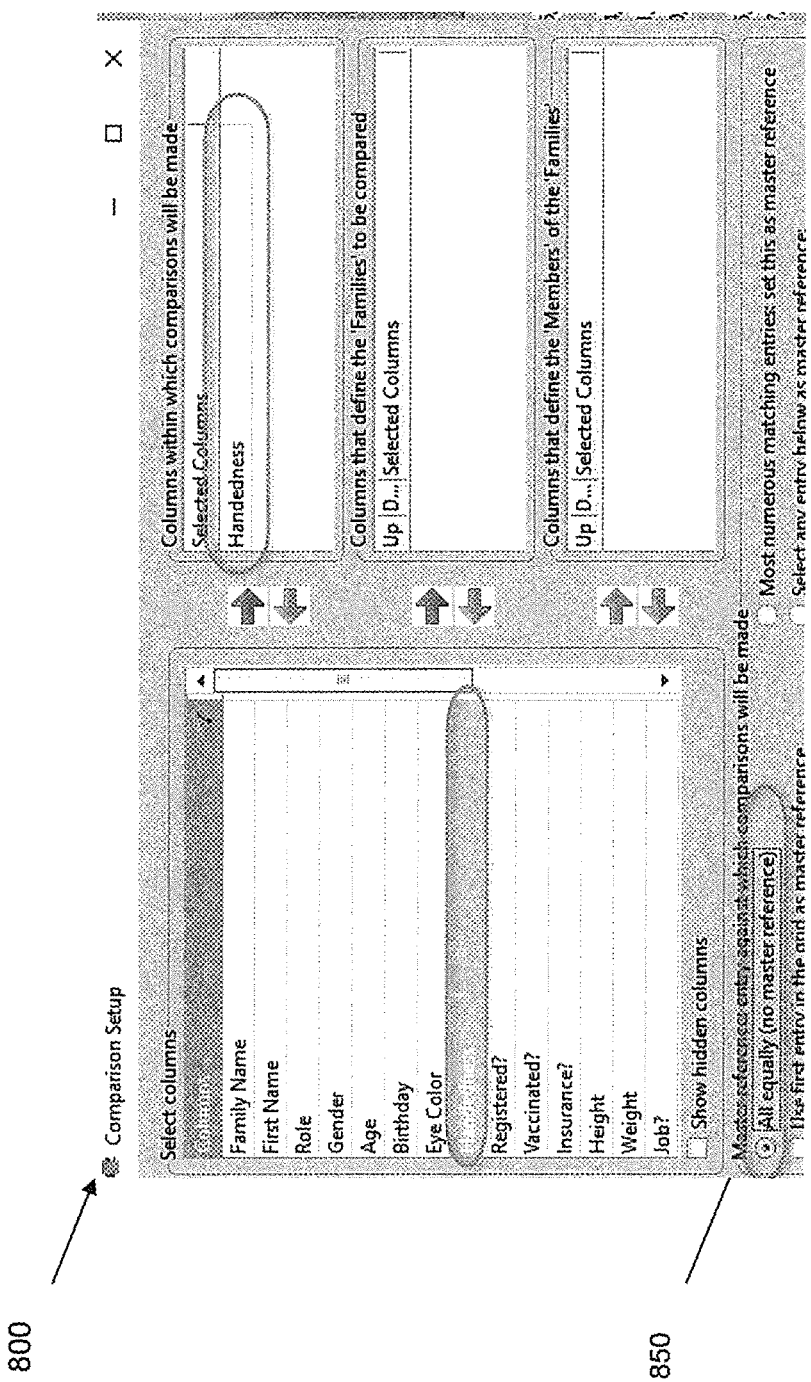
FIG. 11 illustrates a comparison setup dialog box, in accordance with an embodiment.
Figure 12B:
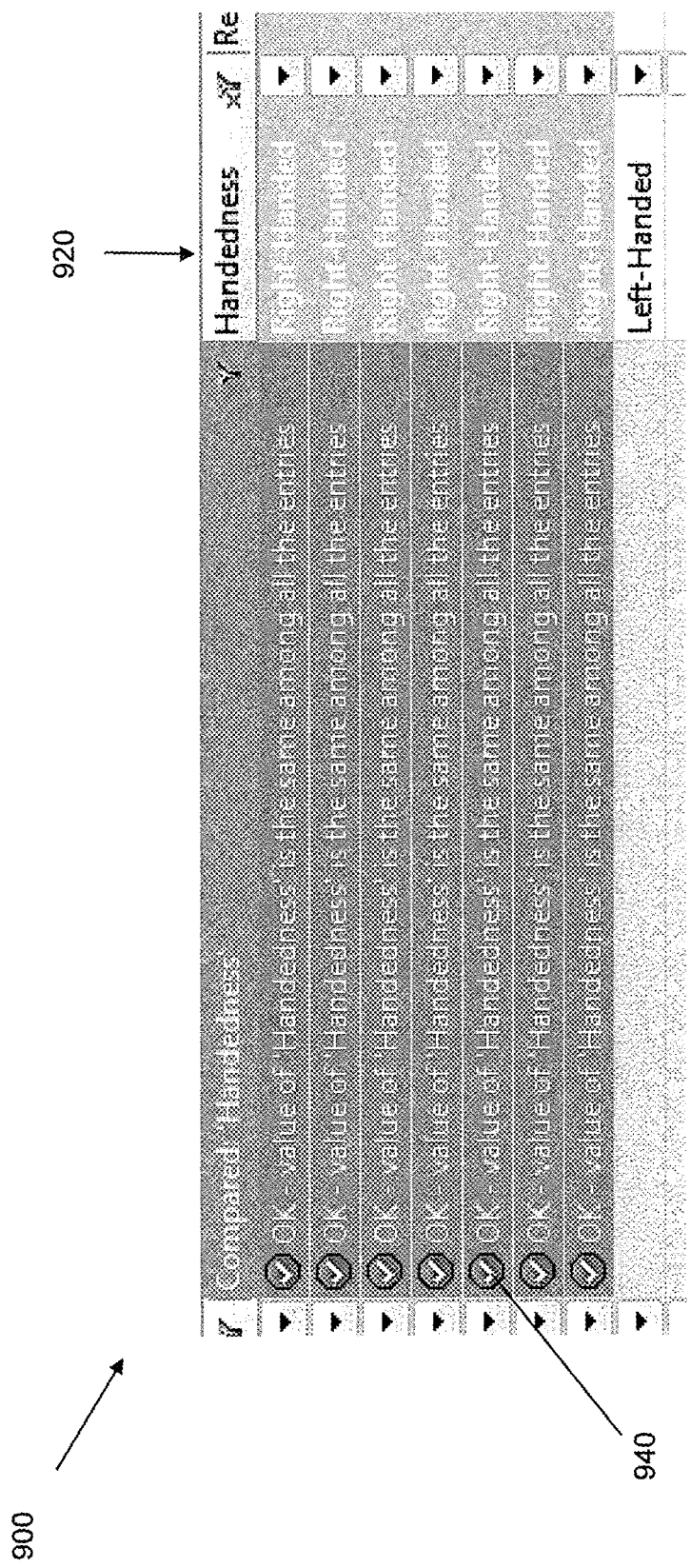

In another example (referred to as "uniformity comparison"), and as illustrated in FIGS. 11 and 12A-B the uniformity comparison method may include some steps of the regular comparison method and generally comprises the steps that are carried out and/or perceived by the user of:
1) Opening the comparator setup dialog box 800:
   a) Selecting "All equally (no master reference)" option in the references selection area 850.
2) Launching the uniformity comparison process by clicking on the "OK" button.
3) Displaying the results within the grid.

In this example, when all the data of a given column are identical, the data elements are all marked as "OK" and highlighted in a first shade. When there are data elements that are different for the selected column, then the data elements are all marked as "FAIL" and highlighted in a second shade.

A comparison result in accordance with this embodiment is exemplified in FIG. 12A, where the grid 900 displays negative indicators at 940, marking the compared data in column 920 as being non-identical throughout the selection of entries being compared. The data elements in column 920 are hence marked as "FAIL" with results 940.

In the embodiment illustrated on FIG. 12B, the grid 900 displays indicators 940 which indicate that all the selection of entries is identical for the column 920 being compared. The data elements in column 920 are hence marked as "OK" with results 940.

Figure 13:
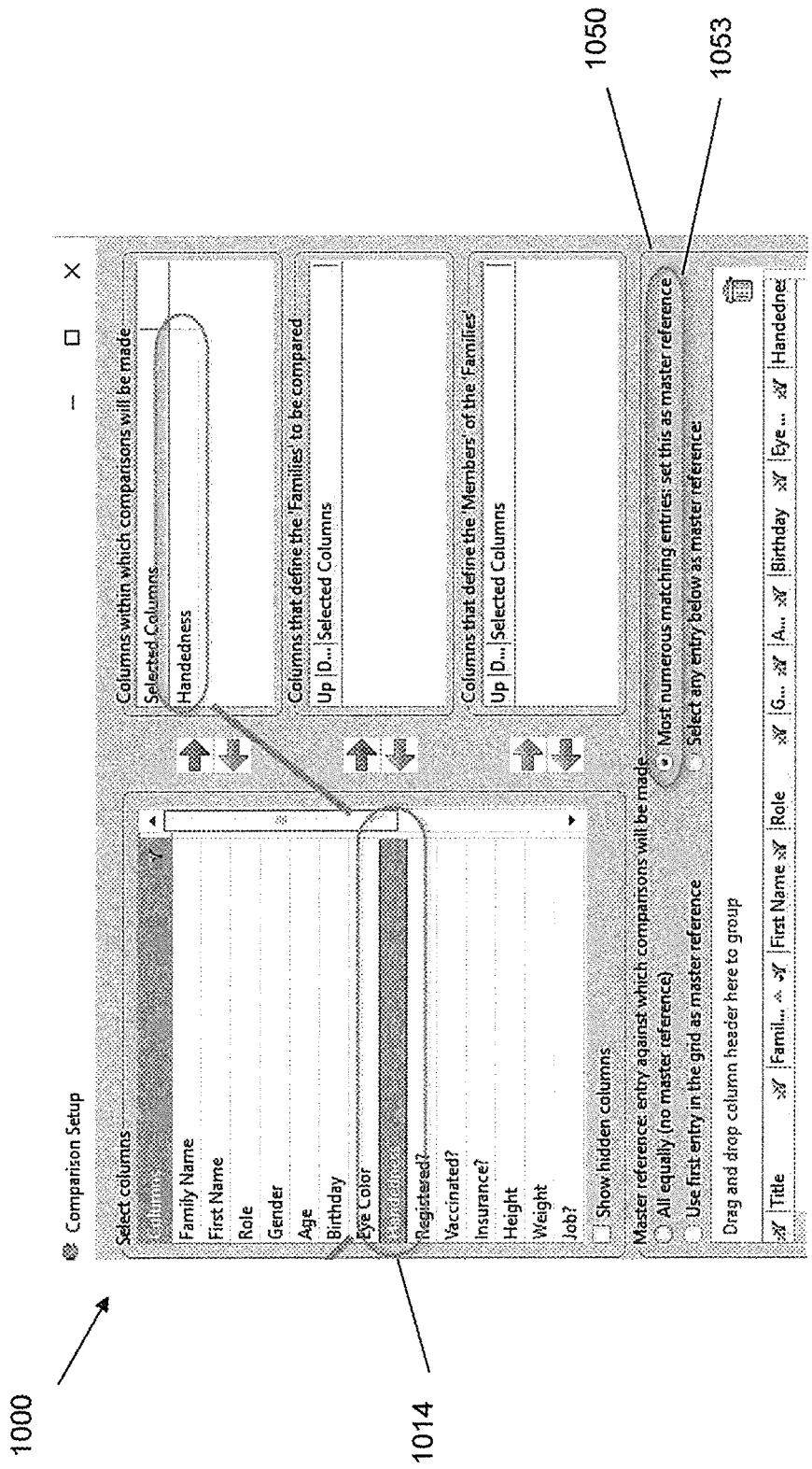
FIG. 13 illustrates a comparison setup dialog box, in accordance with an embodiment.
Figure 14:
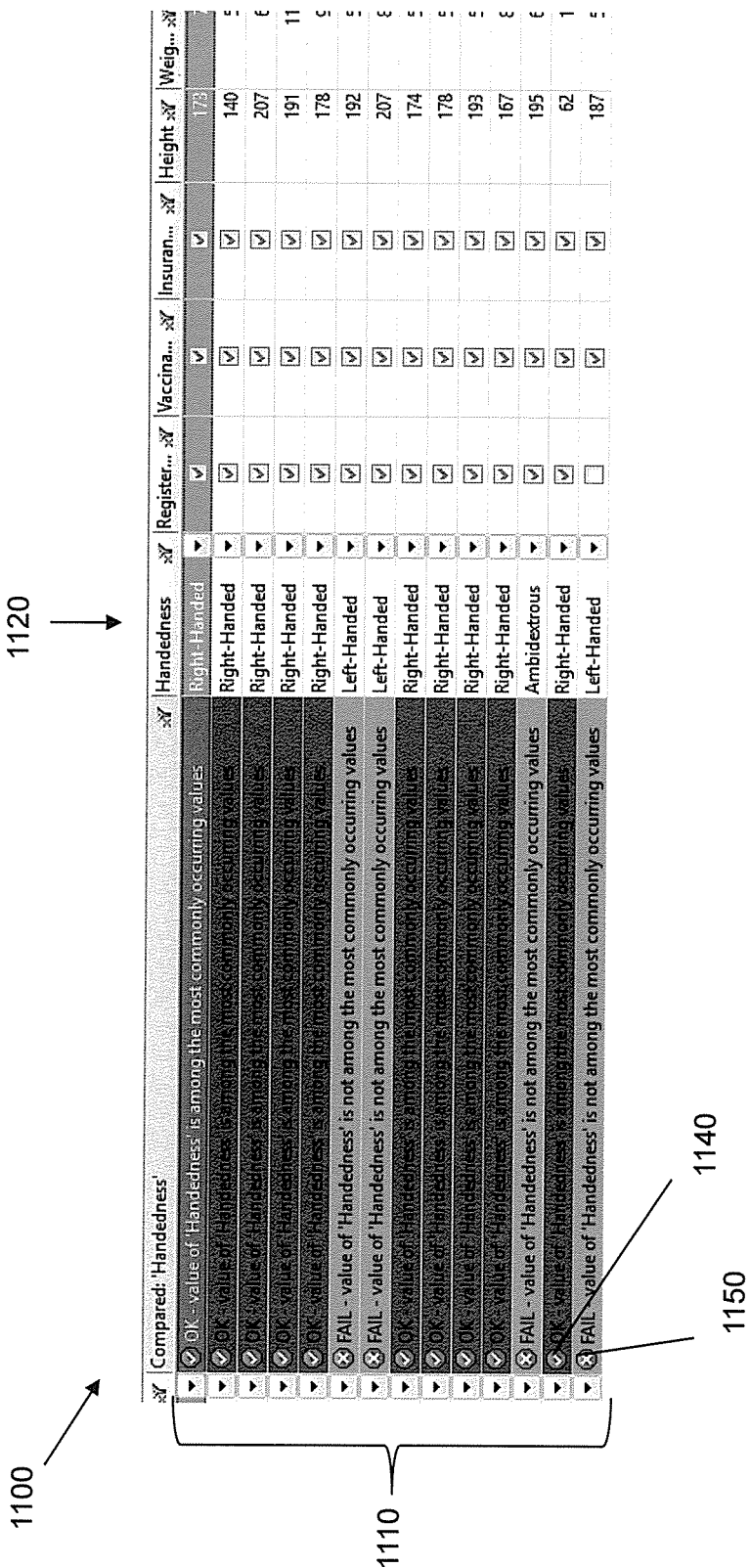
FIG. 14 illustrates a visual representation of the electronic copy of a dataset showing comparison results, in accordance with an embodiment.

In another example (referred to as "statistical comparison"), and as illustrated in FIGS. 13 and 14, the statistical comparison method generally includes some steps of the regular comparison method and includes the steps that are carried out and/or perceived by the user of:
1) Opening the comparator setup dialog box 1000:
   a. Selecting "Most numerous matching entries: set this as master reference" option 1053 in the references selection area 1050.
   b. Selecting the data to be compared.
2) Launching the comparison process by click on the "OK" button
3) Comparing the columns-to-compare 1014 with the entry having the largest occurrence.
4) Displaying the results within the grid.

In this example, and referring to FIG. 14, the grid 1100 containing data 1110 and displaying results 1140 and 1150 is shown. The data elements defined by the property 1120 matching the entry having the largest occurrence are highlighted in the darker shade and marked as "OK" (for example 1140). The data that do not match the reference are highlighted in in the lighter shade and marked as "FAIL" (for example 1150).

Figure 15:
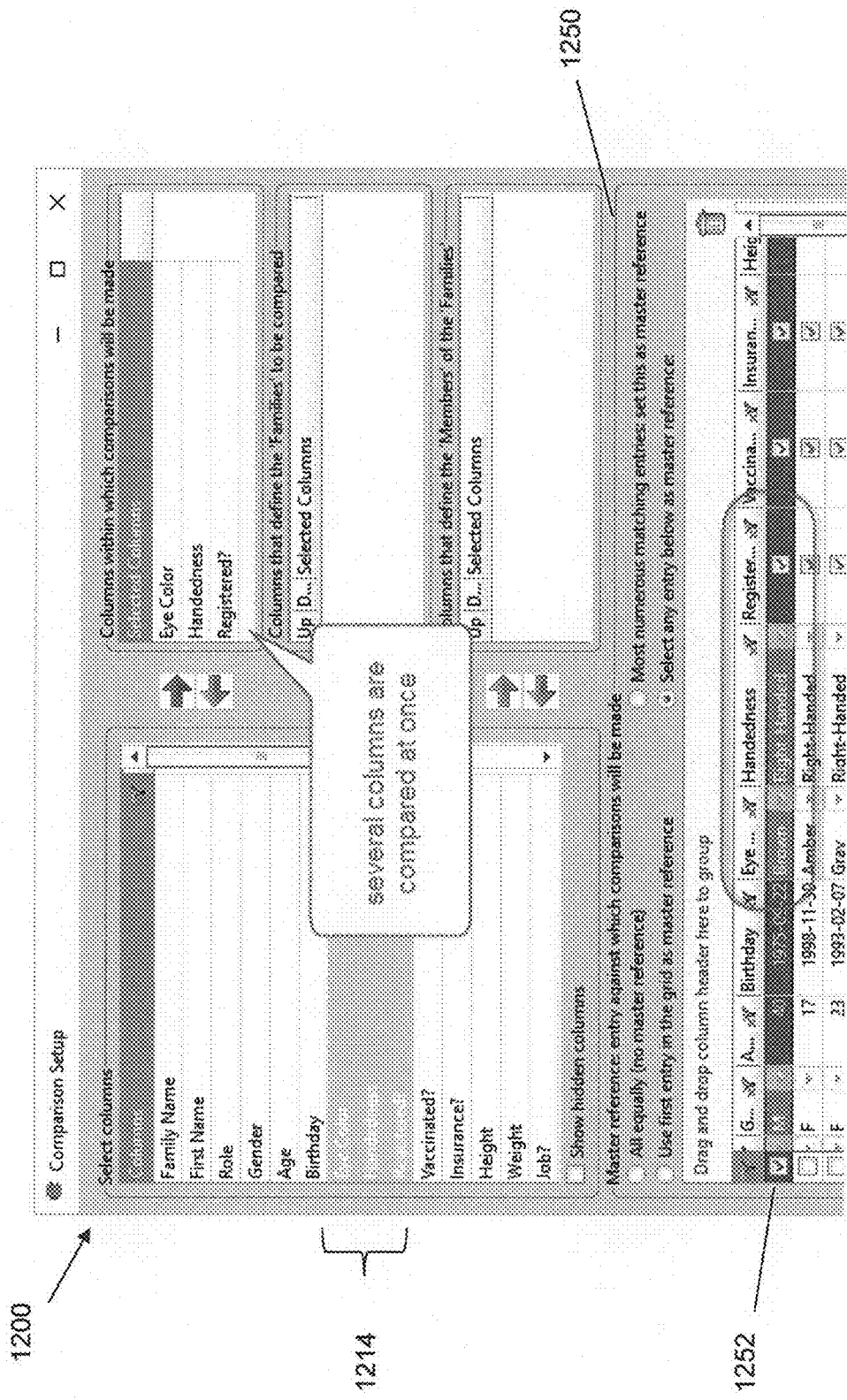
FIG. 15 illustrates a comparison setup dialog box, in accordance with an embodiment.

In another example (referred to as "multi-value comparison"), and as illustrated in FIGS. 15 and 16, the multi-value comparison with general result flags method may include some steps of the regular comparison method and generally comprises the steps that are carried out and/or perceived by the user of:
1) Opening the comparator setup 1200:
   a. Selecting "Select any entry below as master reference" option in the reference selection area 1250.
   b. Selecting the reference entry 1252.
   c. Selecting columns-to-compare 1214.
2) Launching the comparison process. In this comparison process, each compared column will be tagged with the regular comparison method result column, as shown in the regular comparison method.

Data matching the reference may be highlighted in darker shade and marked as "OK" while the data that do not match the reference may be highlighted in the lighter shade and marked as "FAIL". A general result flag is displayed to the left of the grid 1300. Namely, a positive general result flag 1340 is displayed in visual association with the entry having been compared when all the data compared for that entry match the corresponding values of the reference 1252. Alternatively, a negative general result flag 1350 is displayed in visual association with the entry having been compared when at least one data element differs from a corresponding value of the reference 1252.

Figure 18:
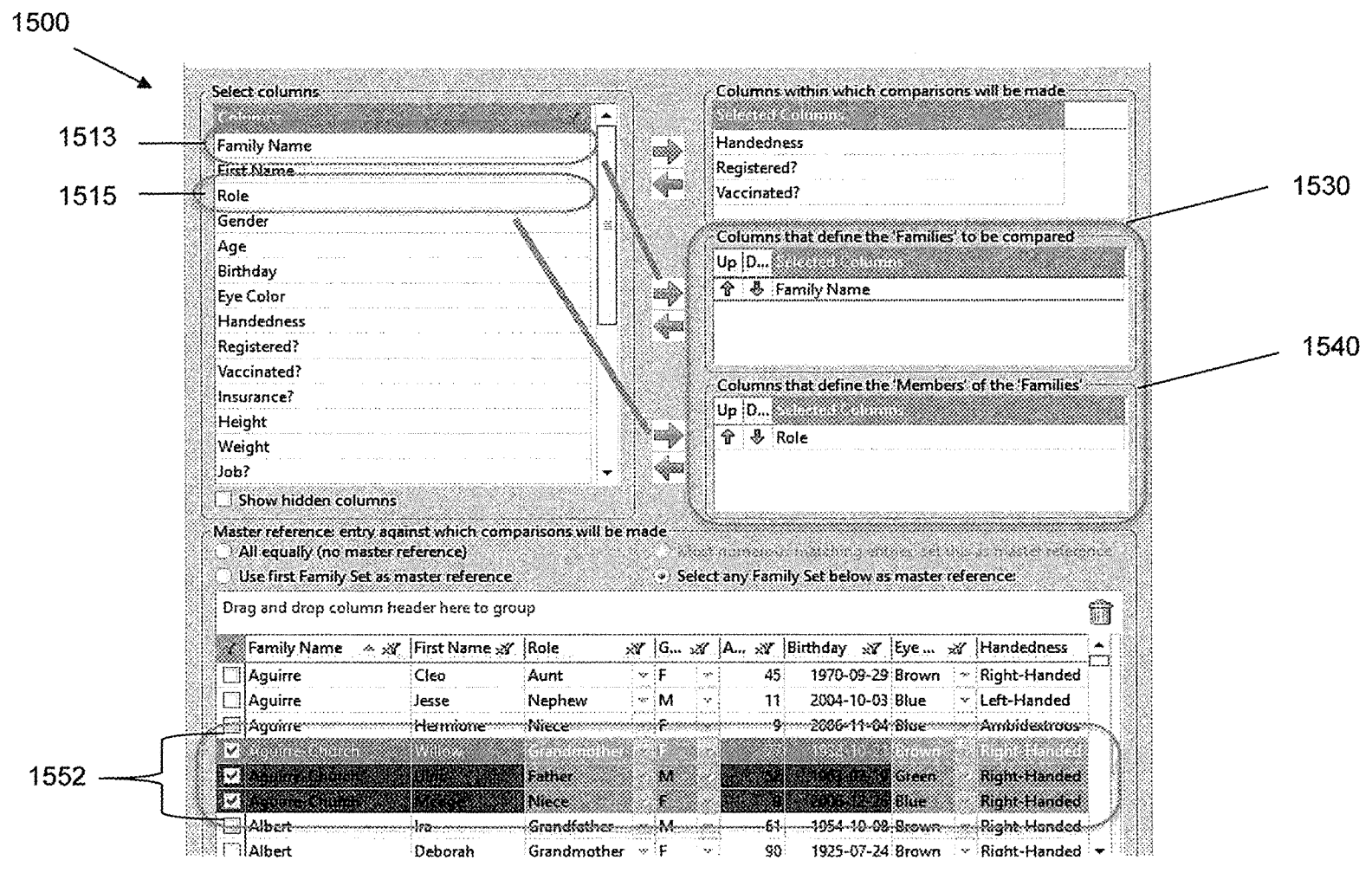
Figure 19:
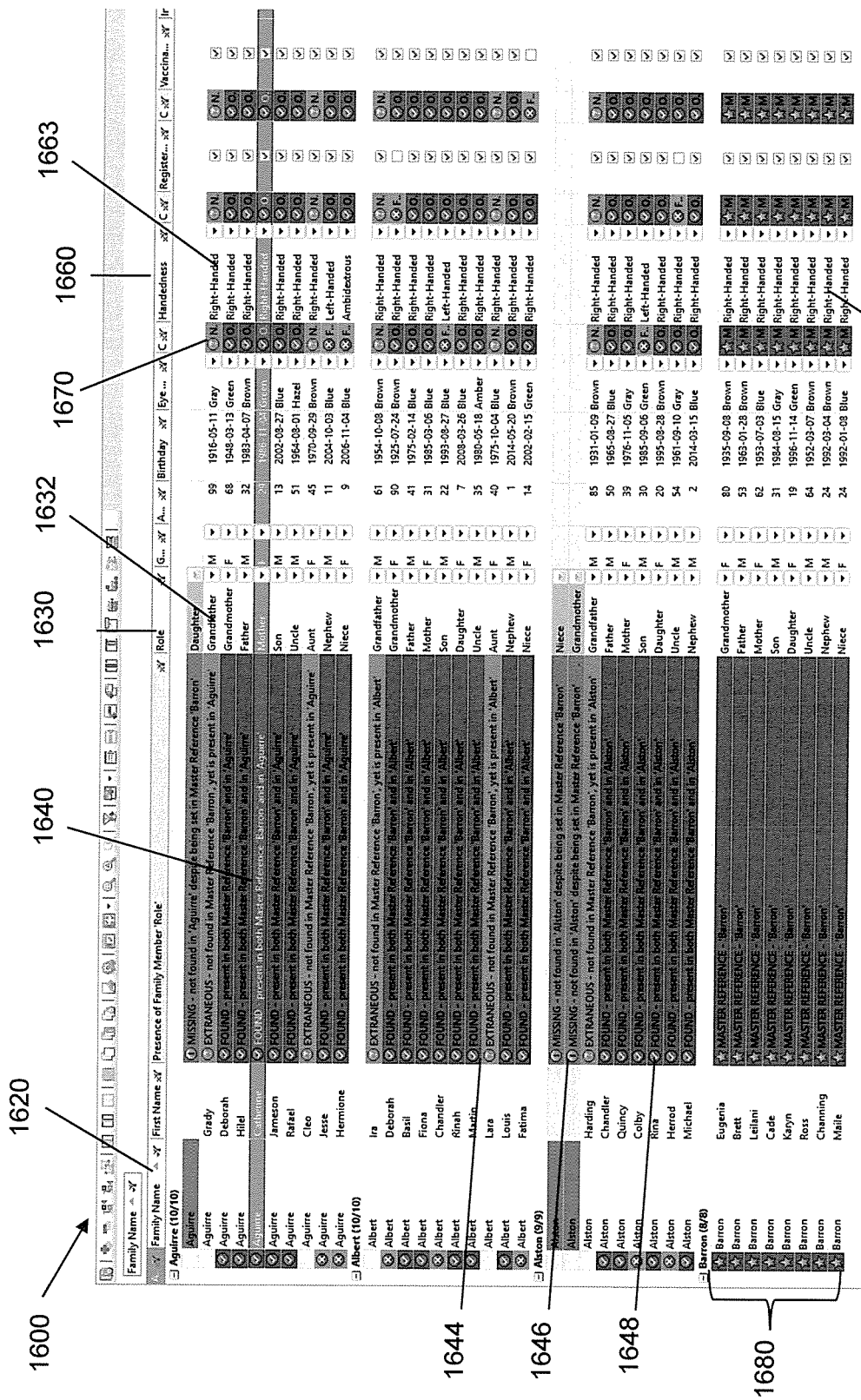
FIG. 19 illustrates a visual representation of the electronic copy of a dataset, in accordance with an embodiment.

In another example (referred to as "family comparison"), and as illustrated in FIGS. 17 to 19, the data is structured to represent groups of data, which are defined as "families". In the illustrated embodiments, data 1422, 1424 and 1426 are members of the family 1420.

In this example, the comparator setup dialog box 1500 allows the user to define which grid columns uniquely define the family, and which columns uniquely define the members of the family 1420, and which columns uniquely define the members 1422, 1424, and 1426 of the family 1420. Namely, in the illustrated example, at 1530, a property, such as "Family Name" 1513 is chosen as the column that defines each family and at 1540, the property "Role" 1515 is chosen as the column that defines the members of the families.

In this example, the family comparison method may include some steps of the regular comparison method and generally includes the steps that are carried out and/or perceived by the user of:

1) Performing the regular data comparison described above, but only between corresponding members of family 1552 and another family to which they are compared.
2) Checking the presence of family members in accordance with the master reference family.

In the embodiment illustrated on FIG. 19, the grid 1600 displays data designated by family defined by property 1620, family members defined by property 1630, and results 1640. The family members will be marked as "EXTRANEOUS" 1644 with a first color (lightest shade in FIG. 19) when the member from the compared family was not found among members of the reference family 1680. Members existing in the reference family that are not found in the compared families will be marked as MISSING 1646 throughout newly inserted rows formatted with a second color (second lightest shade in FIG. 19). Members found to exist in both the reference family and compared families are marked as FOUND 1648 with a third color (darkest shade in FIG. 19). For members determined as FOUND, the results 1670 are displayed to allow comparison of the values 1663 in the property 1660 for the values 1662 of the corresponding reference family member. Data matching the reference are shown with a check mark and highlighted with a first color for that column. Data not matching the reference are shown with an X mark and highlighted with a second color for that column.

It should be understood that numerous modifications and variations may apply to the above described embodiments. For example, depending on embodiments, the reference value may be input by the user, or it may be generated automatically by the system.

Furthermore, the steps involving clicking on buttons or checking boxes as it has been previously described may be replaced by equivalent steps, such as, for example, filling an empty case with a reference data to be compared with other data. In such embodiments, the reference may be numerical or qualitative value that is provided by the user. Then, one of the few examples described above may be followed in order to compare the data contained in the grid with the reference provided by the user. It will be understood that the buttons or checked boxes may also be embodied by cursor on a sliding bar, a scale, a drop-down list, an icon, combinations thereof, or any other ways that allow the starting of a command.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A computer-implemented method for comparing electronic data, the method comprising:
creating an electronic copy of a source electronic dataset, the copy having a set of a plurality of identifier entries, each identifier entry being logically associated with a set of attribute entries, each attribute entry being defined by an attribute type and defining an attribute of an entity identified by the identifier entry;
receiving a comparison request indicating a first subset of the plurality of identifier entries to be compared, a second subset of at least one attribute type to be compared for the first subset of identifier entries, and at least one reference identifier entry;
for each pair of identifier entry of the first subset and to-be-compared attribute type of the second subset:
determining whether the attribute entry of the to-be-compared attribute type logically associated with the reference identifier entry matches the attribute entry of the same attribute type logically associated to the identifier entry of the first subset;
outputting the outcome of the determination within a comparison result for the pair of identifier entry and to-be-compared attribute type of the first and second subsets; and
storing the comparison result for the identifier entry of the first subset as an additional attribute entry of a new attribute type within the set of attribute entries logically associated with the identifier entry and storing a flag entry of a first type in logical association with the additional attribute entry of the new attribute type;
subsequent to storing the results of the comparison, visually displaying the set of attribute entries logically associated to each identifier entry;
receiving a modification request indicating a to-be-modified identifier entry being one of the identifier entries of the first subset, a to-be-modified attribute type being one of the at least one attribute type of the second subset, and a modifier attribute entry;
modifying the attribute entry of the electronic copy logically associated to the to-be-modified identifier entry and of the to-be-modified attribute type with the modifier attribute entry, whereby the attribute entry is modified by the modifier attribute entry and storing a flag entry of a second type in logical association with the attribute entry modified by the modifier attribute entry; and
receiving a saving request;
in response to the saving request:
generating an intermediate copy, the generating comprising identifying and including one or more attribute entries of the electronic copy logically associated with the flag entry of the second type and omitting attribute entries logically associated with the flag entry of the first type; and
updating the source electronic dataset based on the intermediate copy.

2. The computer-implemented method of claim 1, wherein visually displaying the set of attribute entries comprises visually displaying the attribute entries forming the electronic copy and the additional attribute entries storing the comparison results within a single visual table.

3. The computer-implemented method of claim 1, wherein the additional attribute entry of the new attribute type stored within the set of attribute entries logically associated with the identifier entry stores the comparison result of the comparison for the pair of identifier entry and the to-be-compared attribute type; and wherein the additional attribute entry is logically associated with the attribute entry of the to-be-compared attribute type for the identifier entry.

4. The computer-implemented method of claim 1, further comprising:

upon replacing the attribute entry logically associated to the to-be-modified identifier entry and of the to-be-modified attribute type with the modifier attribute entry, further determining whether the modified attribute entry of the attribute type matches the attribute entry of the same attribute type logically associated with the reference identifier entry; and storing the outcome of the further determination as the additional attribute entry of the new attribute type within the set of attribute entries logically associated to the to-be-modified identifier entry; and wherein visually displaying the set of attribute entries logically associated to each identifier entry comprises visually displaying the additional attribute entry storing the outcome of the further determination.

5. The computer-implemented method of claim 1, wherein one or more attribute entries having been modified in response to a modification request within the electronic copy are applied to update one or more corresponding dataset entries within the source electronic dataset.

6. A non-transitory computer-readable storage medium comprising computer-executable instructions for performing the method of claim 1.

7. The method of claim 1, wherein the intermediate copy is a sparse set of attribute entries formed of the modified attribute entries logically associated with the flag entry of the second type.

8. A computer-implemented method for comparing electronic data, the method comprising:

creating an electronic copy of a source electronic dataset, the copy having a set of a plurality of identifier entries, each identifier entry being logically associated with a set of attribute entries, each attribute entry being defined by an attribute type and defining an attribute of an entity identified by the identifier entry;

receiving a comparison request indicating a first subset of the plurality of identifier entries to be compared, a second subset of at least one attribute type to be compared for the first subset of identifier entries, and at least one reference identifier entry;

for each pair of identifier entry of the first subset and to-be-compared attribute type of the second subset:

determining whether the attribute entry of the to-be-compared attribute type logically associated with the reference identifier entry matches the attribute entry of the same attribute type logically associated to the identifier entry of the first subset;

outputting the outcome of the determination within a comparison result for the pair of identifier entry and to-be-compared attribute type of the first and second subsets;

storing the comparison result for the identifier entry of the first subset as an additional attribute entry of a new attribute type within the set of attribute entries logically associated with the identifier entry; and storing a flag entry of a first type in logical association with the additional attribute entry;

subsequent to storing the results of the comparison, visually displaying the set of attribute entries logically associated to each identifier entry;

receiving a modification request indicating a to-be-modified identifier entry being one of the identifier entries of the first subset, a to-be-modified attribute type being one of the at least one attribute type of the second subset, and a modifier attribute entry;

modifying the attribute entry of the electronic copy logically associated to the to-be-modified identifier entry and of the to-be-modified attribute type with the modifier attribute entry, whereby the attribute entry is modified by the modifier attribute entry;

storing a flag entry of a second type in logical association with the attribute entry modified by the modifier attribute entry;

upon replacing the attribute entry logically associated to the to-be-modified identifier entry and of the to-be-modified attribute type with the modifier attribute entry, further determining whether the modified attribute entry of the attribute type matches the attribute entry of the same attribute type logically associated with the reference identifier entry;

storing the outcome of the further determination as the additional attribute entry of the new attribute type within the set of attribute entries logically associated to the to-be-modified identifier entry;

receiving a saving request;

in response to the saving request, updating the source electronic dataset in accordance with modifications to the electronic copy;

wherein visually displaying the set of attribute entries logically associated to each identifier entry comprises visually displaying the additional attribute entry storing the outcome of the further determination;

wherein the additional attribute entries storing the comparison results are omitted when updating the source electronic dataset;

wherein attribute entries logically associated with the flag entry of the first type are omitted when updating the source electronic dataset; and wherein attribute entries logically associated with the flag entry of the second type are applied to update corresponding dataset entries within the source electronic dataset.

9. A computer-implemented system for comparing electronic data, the system comprising:

at least one data storage device; and at least one processor operably coupled to the at least one storage device, the at least one processor being configured for:

creating an electronic copy of a source electronic dataset, the copy having a set of a plurality of identifier entries, each identifier entry being logically associated with a set of attribute entries, each attribute entry being defined by an attribute type and defining an attribute of an entity identified by the identifier entry;

receiving a comparison request indicating a first subset of the plurality of identifier entries to be compared, a second subset of at least one attribute type to be compared for the first subset of identifier entries, and at least one reference identifier entry;

for each pair of identifier entry of the first subset and to-be-compared attribute type of the second subset:
    determining whether the attribute entry of the to-be-compared attribute type logically associated with the reference identifier entry matches the attribute entry of the same attribute type logically associated to the identifier entry of the first subset;
    outputting the outcome of the determination within a comparison result for the pair of identifier entry and to-be-compared attribute type of the first and second subsets; and
    storing the comparison result for the identifier entry of the first subset as an additional attribute entry of a new attribute type within the set of attribute entries logically associated with the identifier entry and storing a flag entry of a first type in logical association with the additional attribute entry of the new attribute type;
subsequent to storing the results of the comparison, visually displaying the set of attribute entries logically associated to each identifier entry;
receiving a modification request indicating a to-be-modified identifier entry being one of the identifier entries of the first subset, a to-be-modified attribute type being one of the at least one attribute type of the second subset, and a modifier attribute entry;
modifying the attribute entry of the electronic copy logically associated to the to-be-modified identifier entry and of the to-be-modified attribute type with the modifier attribute entry, whereby the attribute entry is modified by the modifier attribute entry and storing a flag entry of a second type in logical association with the attribute entry modified by the modifier attribute entry; and
receiving a saving request;
in response to the saving request:
    generating an intermediate copy, the generating comprising identifying and including one or more attribute entries of the electronic copy logically associated with the flag entry of the second type and omitting attribute entries logically associated with the flag entry of the first type; and
    updating the source electronic dataset based on the intermediate copy.

10. The system of claim 9, wherein visually displaying the set of attribute entries comprises visually displaying the attribute entries forming the electronic copy and the additional attribute entries storing the comparison results within a single visual table.

11. The system of claim 9, wherein the additional attribute entry of the new attribute type stored within the set of attribute entries logically associated with the identifier entry stores the comparison result of the comparison for the pair of identifier entry and the to-be-compared attribute type; and
wherein the additional attribute entry is logically associated with the attribute entry of the to-be-compared attribute type for the identifier entry.

12. The system of claim 9, wherein the processor is further configured for:
upon replacing the attribute entry logically associated to the to-be-modified identifier entry and of the to-be-modified attribute type with the modifier attribute entry, further determining whether the modified attribute entry of the attribute type matches the attribute entry of the same attribute type logically associated with the reference identifier entry; and storing the outcome of the further determination as the additional attribute entry of the new attribute type within the set of attribute entries logically associated to the to-be-modified identifier entry;
wherein visually displaying the set of attribute entries logically associated to each identifier entry comprises visually displaying the additional attribute entry storing the outcome of the further determination.

13. The system of claim 9, wherein one or more attribute entries having been modified in response to a modification request within the electronic copy are applied to update one or more corresponding dataset entries within the source electronic dataset.

14. The system of claim 9, wherein the intermediate copy is a sparse set of attribute entries formed of the modified attribute entries logically associated with the flag entry of the second type.

15. A computer-implemented system for comparing electronic data in the system comprising:
at least one data storage device; and
at least one processor operably coupled to the at least one storage device, the at least one processor being configured for:
    creating an electronic copy of a source electronic dataset, the copy having a set of a plurality of identifier entries, each identifier entry being logically associated with a set of attribute entries, each attribute entry being defined by an attribute type and defining an attribute of an entity identified by the identifier entry;
    receiving a comparison request indicating a first subset of the plurality of identifier entries to be compared, a second subset of at least one attribute type to be compared for the first subset of identifier entries, and at least one reference identifier entry;
    for each pair of identifier entry of the first subset and to-be-compared attribute type of the second subset:
        determining whether the attribute entry of the to-be-compared attribute type logically associated with the reference identifier entry matches the attribute entry of the same attribute type logically associated to the identifier entry of the first subset;
        outputting the outcome of the determination within a comparison result for the pair of identifier entry and to-be-compared attribute type of the first and second subsets;
        storing the comparison result for the identifier entry of the first subset as an additional attribute entry of a new attribute type within the set of attribute entries logically associated with the identifier entry; and
        storing a flag entry of a first type in logical association with the additional attribute entry;
    subsequent to storing the results of the comparison, visually displaying the set of attribute entries logically associated to each identifier entry;
    receiving a modification request indicating a to-be-modified identifier entry being one of the identifier entries of the first subset, a to-be-modified attribute type being one of the at least one attribute type of the second subset, and a modifier attribute entry;
    modifying the attribute entry of the electronic copy logically associated to the to-be-modified identifier entry and of the to-be-modified attribute type with the modifier attribute entry, whereby the attribute entry is modified by the modifier attribute entry;

storing a flag entry of a second type in logical association with the attribute entry modified by the modifier attribute entry;

upon replacing the attribute entry logically associated to the to-be-modified identifier entry and of the to-be-modified attribute type with the modifier attribute entry, further determining whether the modified attribute entry of the attribute type matches the attribute entry of the same attribute type logically associated with the reference identifier entry;

storing the outcome of the further determination as the additional attribute entry of the new attribute type within the set of attribute entries logically associated to the to-be-modified identifier entry;

receiving a saving request;

in response to the saving request, updating the source electronic dataset in accordance with modifications to the electronic copy;

wherein visually displaying the set of attribute entries logically associated to each identifier entry comprises visually displaying the additional attribute entry storing the outcome of the further determination;

wherein the additional attribute entries storing the comparison results are omitted when updating the source electronic dataset;

wherein attribute entries logically associated with the flag entry of the first type are omitted when updating the source electronic dataset; and wherein attribute entries logically associated with the flag entry of the second type are applied to update corresponding dataset entries within the source electronic dataset.

* * * * *